INVENTORS
FRANK DE JAGER
PETRUS J VAN GERWEN
BY

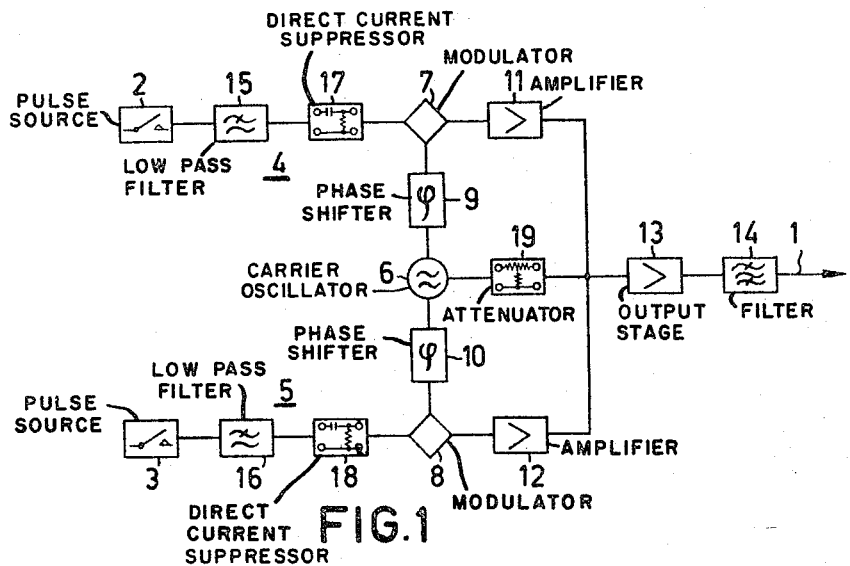
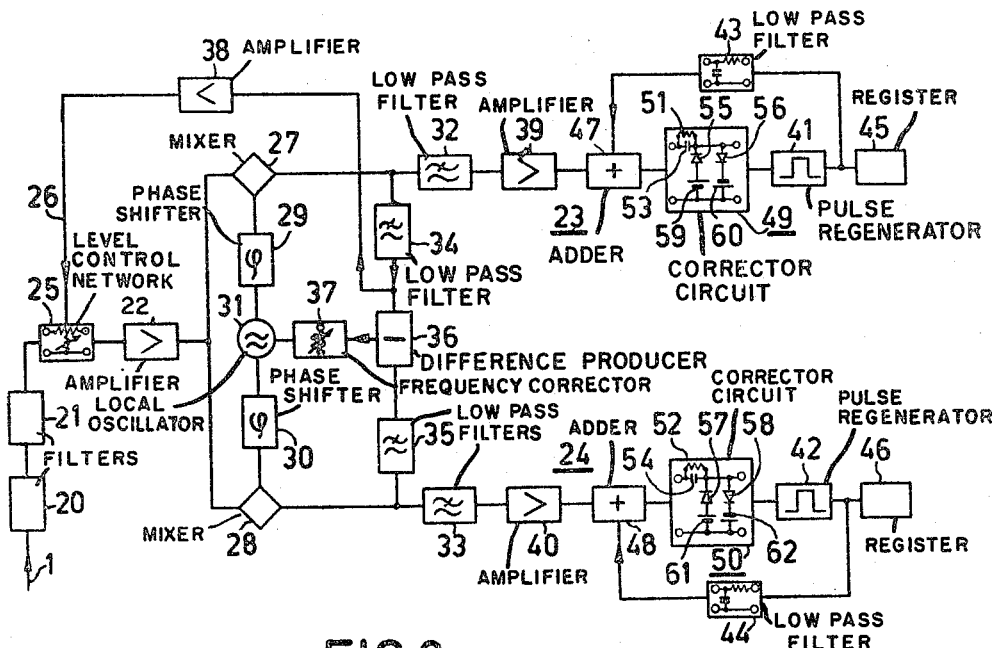

AGENT

INVENTORS
FRANK DE JAGER
PETRUS J. VAN GERWEN

United States Patent Office 3,311,442
Patented Mar. 28, 1967

3,311,442
PULSE TRANSMISSION SYSTEM EMPLOYING QUADRATURE MODULATION AND DIRECT CURRENT SUPPRESSION
Frank De Jager and Petrus Josephus Van Gerwen, Emmasingel, Eindhoven, Netherlands, assignors to North American Philips Company, Inc., New York, N.Y., a corporation of Delaware
Filed Feb. 5, 1963, Ser. No. 256,334
Claims priority, application Netherlands, Feb. 19, 1962, 274,976
15 Claims. (Cl. 325—42)

This invention relates to transmission systems for the transmission of pulse signals, for example pulse-code modulation, synchronous and asynchronous telegraphy signals, in a prescribed transmission band, and to their associated transmitting and receiving devices. In such systems, the pulse signals are transmitted by the transmitter as a modulation on a carrier oscillation through a transmission path to the receiver, and in the receiver the demodulated pulse signals control a pulse regenerator for pulse regeneration.

In pulse transmission devices, for example for use in electronic computers, telex equipment and the like, there is a need for the communication of the pulse signals to utilise existing communication lines designed for speech transmission, which do not have particularly suitable properties for the direct transmission of pulse signals. In fact, in view of the different characters of the signals to be transmitted, the requirements imposed upon the communication line for speech transmission and pulse transmission are also quite different. More particularly, in speech transmission, it is essential only to pay attention to the amplitude versus frequency characteristic over the speech band of from 300 to 3,400 c./s., whereas in the transmission of pulse signals the linearity of the phase versus frequency characteristic also requires special attention, as does the transmission of the direct-current component of the pulse signals, which, as is well-known, constitutes an important component of the pulse information. For undisturbed transmission of the direct-current component it is common practice to modulate the pulse signals on a carrier wave since the direct current component is thus displaced to the carrier frequency and the transmission of pulse signals of a comparatively low pulse frequency, for example of 500 baud, which means at most 500 pulses per second, is then rendered possible in a simple manner via existing communication lines.

Upon increasing the pulse frequency for increasing the information content of the transmitted pulse series, corresponding to an equal increase in the required bandwidth, special additional steps must be taken for the pulse transmissition in view of the unfavourable phase versus frequency characteristic of existing communication lines. For this purpose two different methods are known. More particularly, according to a first method, the total band of the communication line is divided into partial bands of a magnitude such that in each partial band the phase distortions of the pulse signals are still within permissable limits, the pulse information of the original pulse series being divided over these partial bands prior to transmission, and the original pulse series being restored at the receiving end from the information transmitted via the various partial bands. According to the second method, the total band of the communication line is made suitable for the pulse transmission, without division into partial bands, by means of suitable smoothing of the phase versus frequency characteristic. The second method is to be preferred from a viewpoint of economy in equipment and flexibility.

The total band of the communication line has thus become available for the pulse transmission, but the maximum pulse information obtainable via the communication line is still by no means transmitted since the pulse information per c./s. of bandwidth of the communication line is very unfavourable relative to the maxium value obtainable in theory and which, according to the information theorem, is 2 baud per c./s. For example the pulse information in the frequency shift telegraph system developed for telegraph communication through the transatlantic cable for maximum pulse information is still only 0.80 baud per c./s. of bandwidth, the bandwidth of the communication line being measured between the 10 db points of damping.

In the recent development of pulse transmission systems it is a modern problem to increase the pulse information transmitted over the prescribed frequency band of the communication line. For this purpose several pulse transmission systems have already been developed containing per c./s. of bandwdith a pulse information higher than the value of 0.80 baud of the abovementioned frequency shift telegraph system used for transatlantic traffic.

Thus, in a first pulse transmission system, increased pulse information per c./s. of bandwidth has been obtained by using single side-band modulation with a partly suppressed second side-band (vestigial side-band), the carrier wave being located at the upper limit of the transmission band. The pulse information has thus been raised to 1.0 baud per c./s. of bandwidth, but for obtaining undisturbed pulse transmission special steps must be used in this device to ensure accurate smoothing of the damping versus frequency characteristic, especially in the direction of the upper limit of the transmission band.

In a second pulse transmission system of this kind the pulse information has been increased to 1.1 baud per c./s. of bandwidth with the use of a phase modulation method specially developed therefor, but this pulse transmission system has a very complicated structure, for example, it uses 2,500 transistors, has a critical and complicated adjustment, and its flexibility has considerably decreased. This pulse transmission system is unsuitable, for example, for asynchronous telegraphy. Consequently, upon increasing the pulse information, the complication in the structure of the pulse transmission system, together with the accuracy of adjustment were found to increase cumulatively, while the flexibility has also decreased considerably. Thus the international professional world, represented by the C.C.I.T.T., has determined that with the modern technique at most 3,000 baud can be transmitted for the bandwidth of about 2,500 c./s. as commonly used for pulse communication per speech connection, that is to say a pulse information of 1.2 baud per c./s. of bandwidth is now considered by the C.C.I.T.T. as the maximum obtainable.

An object of the invention is to provide a pulse transmisison system of the kind mentioned in the preamble which, on the one hand, with simplicity in structure approaches the pulse information of 2 baud per c./s. of bandwidth obtainable in theory and more particularly increases the pulse information by a factor of 50% and which, on the other hand, is distinguished by its flexibility and not particularly critical adjustment, together with optimum freedom of interference.

According to the invention, a pulse transmission system is provided comprising a transmitting device having two channels including modulators which are connected to a common carrier oscillator. The modulators modulate the pulse signals of these channels on the common carrier oscillation with a mutual phase shift of 90°. At least one transmission channel (first transmission channel) includes a network for suppressing the direct-current component of the pulse signals occurring in this channel. The pulse signals of the two channels thus modulated on the common carrier oscillation, together with a pilot oscillation of carrier frequency, are transmitted together through the transmission path. The receiving device comprises two receiving channels each including a demodulator and a succeeding pulse regenerator. A local carrier oscillation restored from the co-transmitted pilot signal is supplied at least to the demodulator of the receiving channel corresponding to the first transmission channel for demodulating the pulse signals transmitted with suppressed direct-current component. The pulse signals control a pulse regenerator. The generator includes a feedback network in the form of a low-pass filter connected between the output circuit and the input circuit thereof and having a time constant approximately equal to that of the network included in the first transmission channel for suppressing the direct-current component of the pulse signals.

By using the steps according to the invention it has been rendered possible to reconstruct the demodulated pulses free from distortion without any effect from the transmission path and without any effect from components of the two transmitted pulse series, in addition to restoring the local carrier oscillation required for demodulation from the pilot signal with correct phase. This remarkable object has been attained by this quite different concept as compared with known pulse transmission systems of the specified kind for eliminating the influence of the transmission path on the pulse transmission. For example, in one practical embodiment it has been found possible to increase the pulse information to 1.7 baud per c./s. of bandwidth without special steps.

In a very advantageous transmission system according to the invention, each transmission channel includes a network for suppressing the direct-current component. The local carrier frequency for demodulating the pulse signals transmitted with suppressed direct-current component is supplied to the demodulating device in each receiving channel at the receiver, and each pulse generator includes a feedback network in the form of a low-pass filter connected between the output circuit and the input circuit.

In addition to the independency of the phase of the co-transmitted pilot signal relative to the transmitted pulse components, the amplitude of the pilot signal is also independent of these pulse components, thus permitting the pilot signal to be used also for level control and thereby improving further the insensitivity to interference.

In order that the invention may be readily carried into effect, it will now be described in detail, by way of example, with reference to the accompanying diagrammatic drawing, in which:

FIGS. 1 and 2 show transmitting and receiving devices respectively of a pulse transmission system according to the invention;

Figure 14:
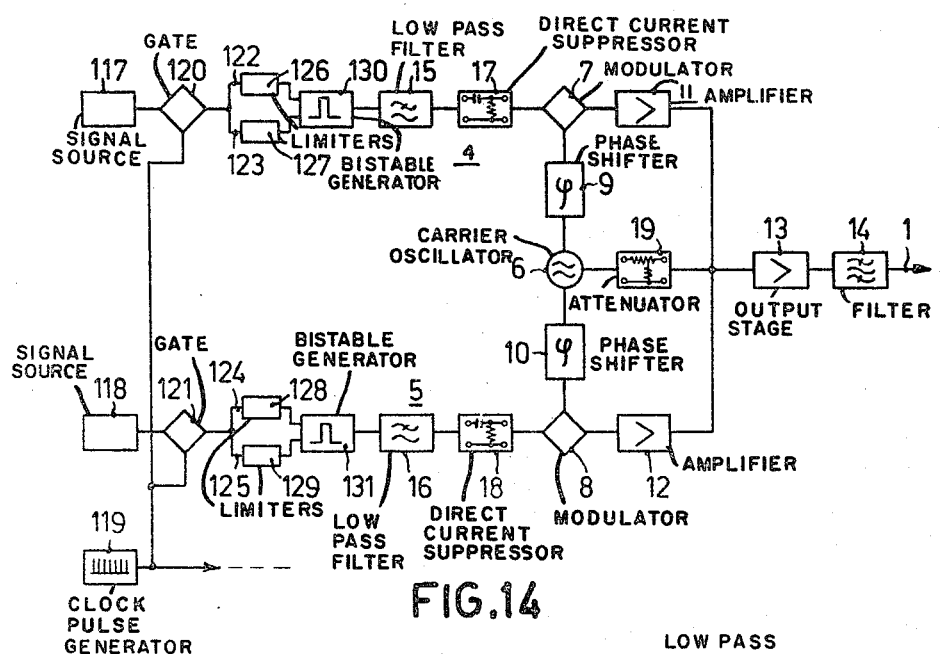
Figure 15:
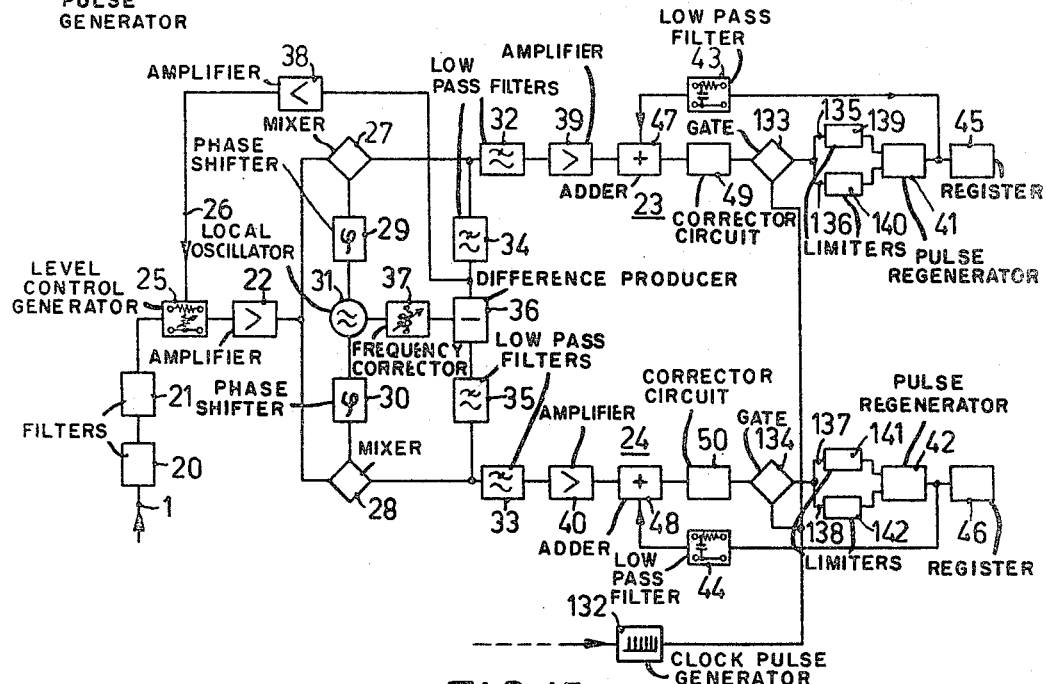
Figure 16:
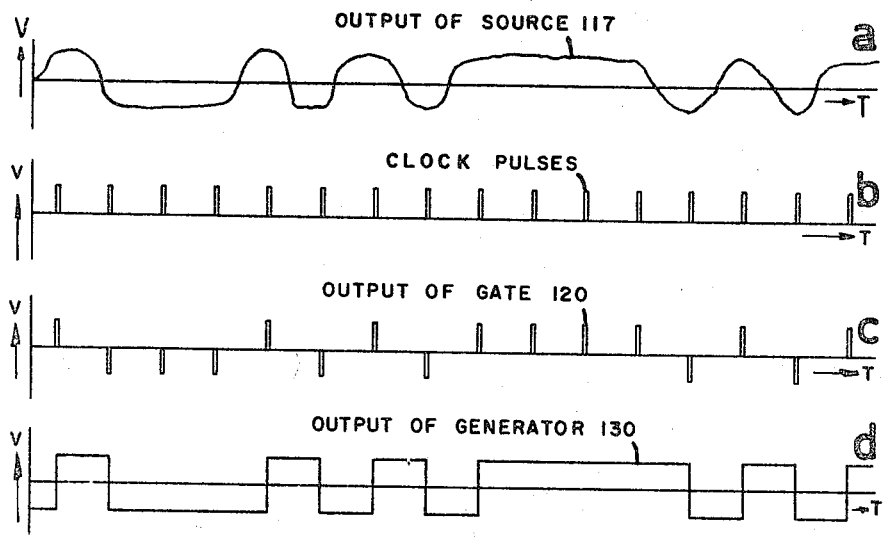
Figure 17:
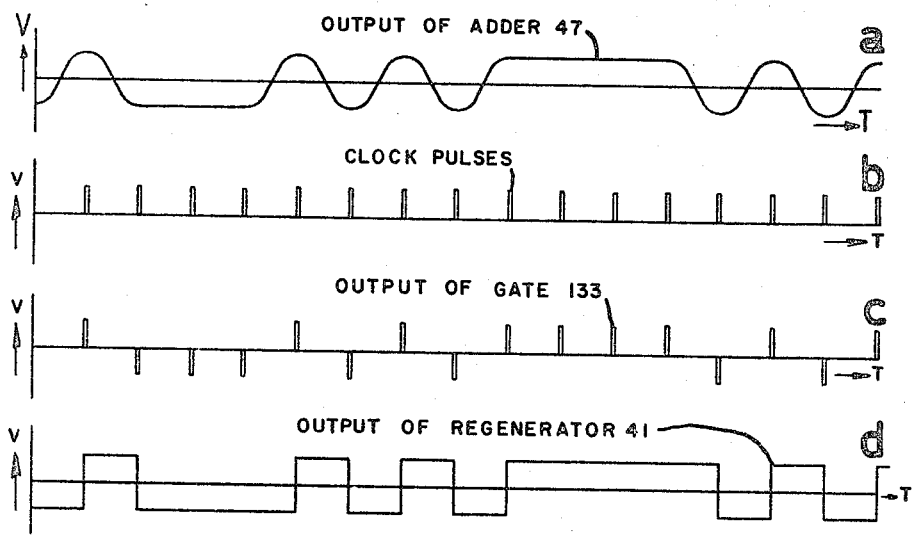
Figure 18:
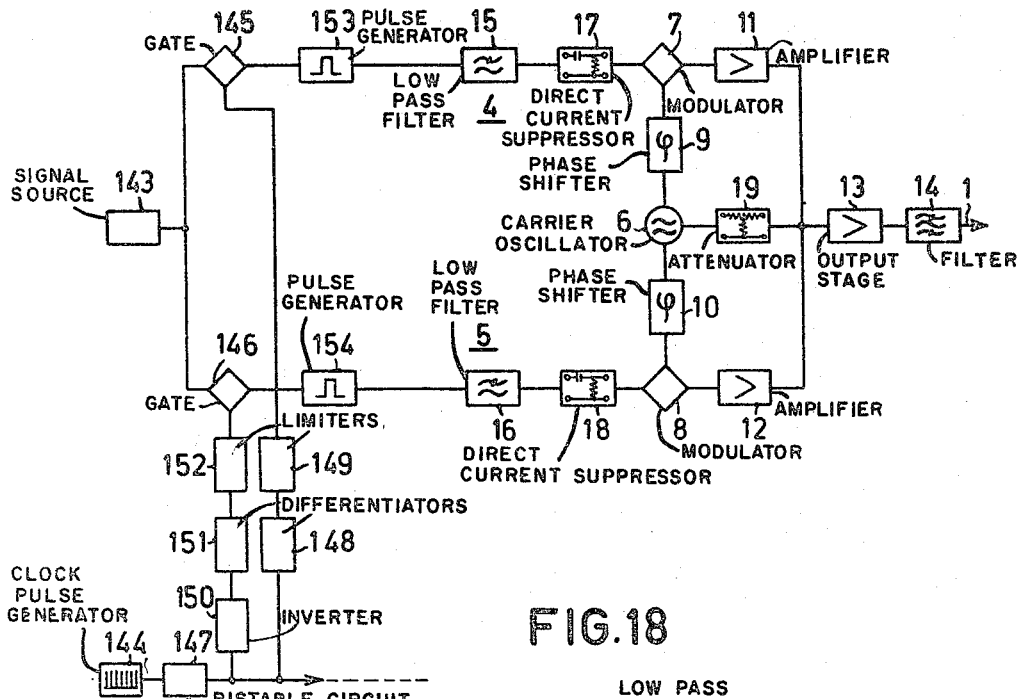
Figure 19:
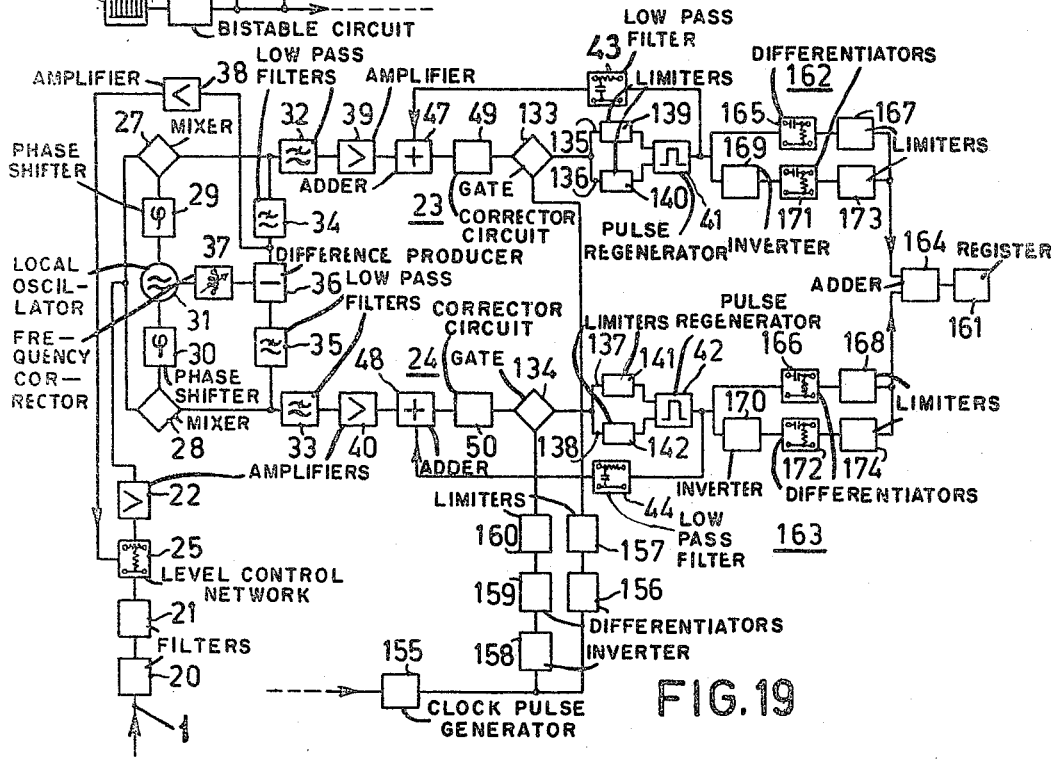
Figure 20:
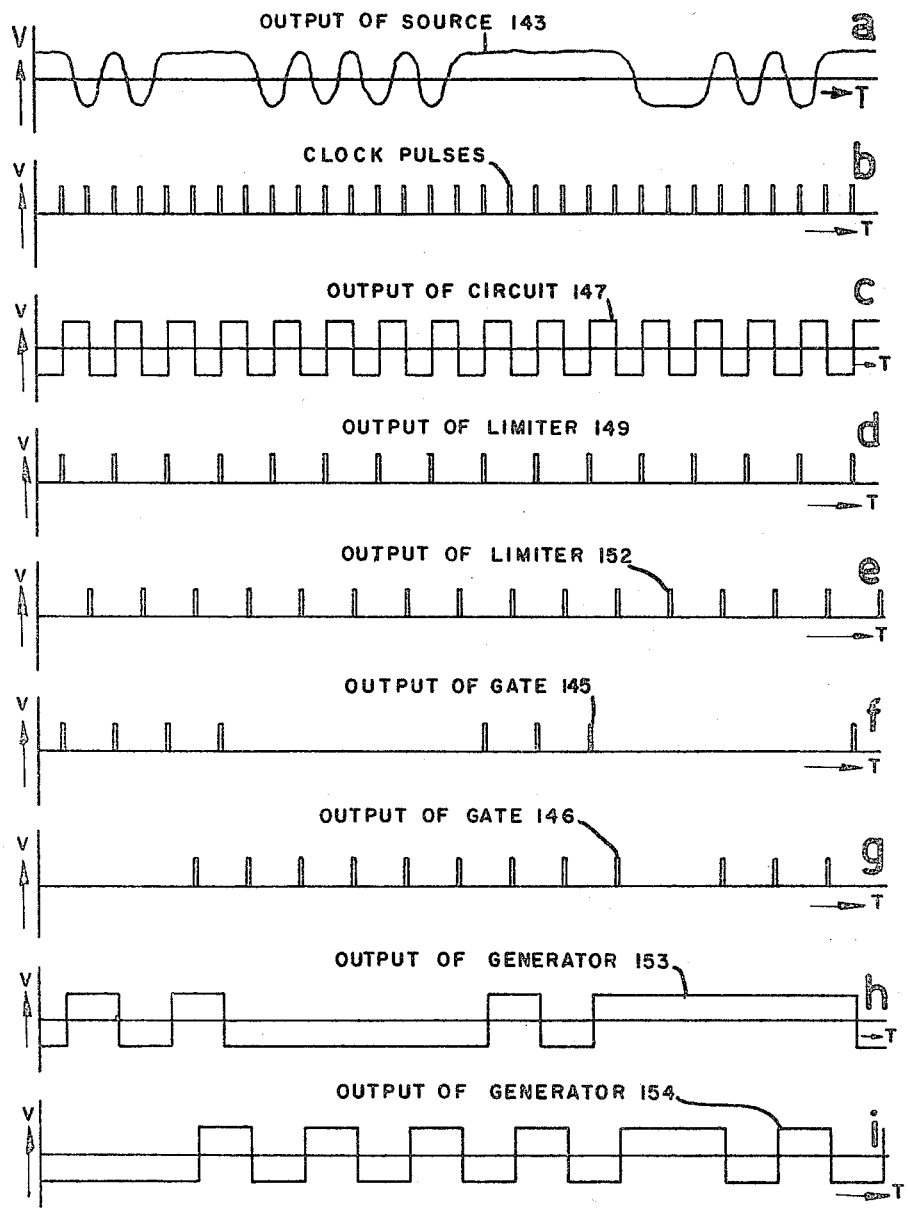
Figure 21:
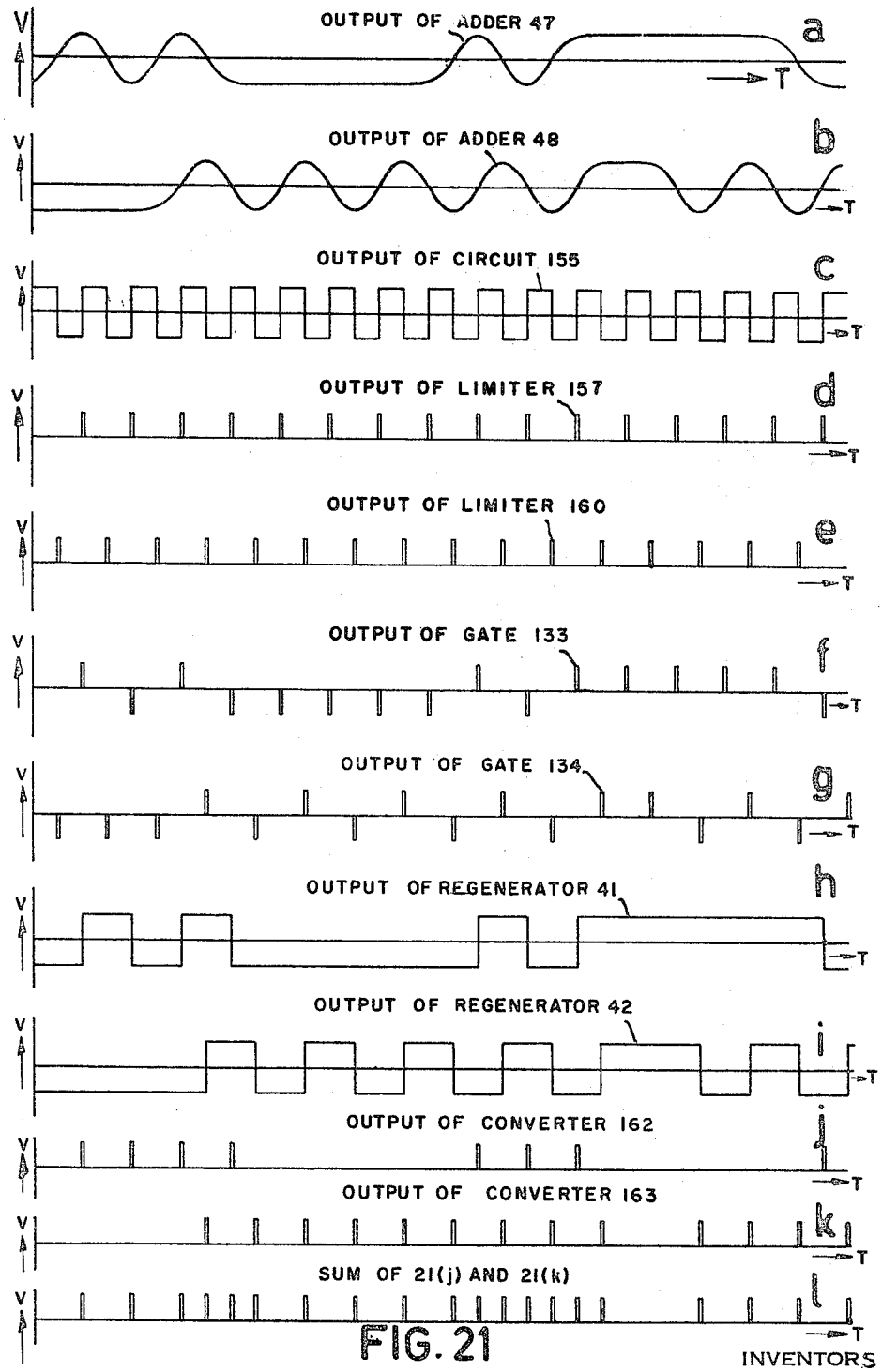

FIGS. 14 and 15 show transmitting and receiving devices according to the invention, designed for synchronous telegraphy or pulse code modulation, FIGS. 16 and 17 showing several time diagrams to explain the devices of FIGS. 14 and 15;

FIGS. 18 and 19 show preferred embodiments of transmitting and receiving devices according to the invention for synchronous telegraphy or pulse code modulation, FIGS. 20 and 21 showing several time diagrams to explain the devices of FIGS. 18 and 19.

Referring now to FIG. 1, this figure shows a transmitting device of a pulse transmission system according to the invention for the transmission through a transmission line 1 of asynchronous telegraph signals located in the speech band. For this purpose the frequency band of from 500 to 3,200 c./s. is commonly used. The asynchronous telegraph signals are derived from two pulse sources 2 and 3 connected to transmission channels 4 and 5, respectively. The two transmission channels 4, 5 are similar in structure and each designed for the transmission of telegraph pulses at a transmission speed of 2,250 baud.

For the transmission of the telegraph pulses of the two transmission channels 4, 5 through the common transmission line 1, the transmission channels 4, 5 include amplitude modulators 7, 8 respectively in the form of push-pull modulators, for example, ring modulators, which are connected to a common carrier oscillator 6. The carrier oscillation is modulated in the amplitude modulators 7 and 8 with a mutual phase shift of 90°. To this end, in the embodiment shown, the connecting lines to the amplitude modulators 7, 8 include phase-shifting networks 9 and 10 respectively which cause the carrier oscillation to lead by 45° and to lag by 45° respectively. The output voltages of the two amplitude modulators 7, 8 are applied to separating amplifiers 11, 12 and, after amplification and, if desired, frequency transposition in an output stage 13 including an output filter 14, to the transmission line 1.

The transmission channels 4, 5 include low-pass filters 15, 16 having a limiting frequency of 1,350 c./s. for suppressing the spectrum components located slightly above the half pulse frequency of 2,250/2=1,125 c./s. and also include networks 17, 18 for suppressing the direct-current component of the pulses, having a limiting frequency of for example 50 c./s., corresponding to a time constant of 3.2 msec., which is longer than the duration of the shortest pulse so that of the telegraph pulses of 2,250 baud only the frequency spectrum of 50 c./s. to 1,350 c./s. is applied to the amplitude modulators 7, 8 for modulating the carrier oscillation of, for example, 1,850 c./s. The networks 17, 18 for suppressing the direct-current component of the pulses may be designed in different ways, for example each in the form of a high-pass filter which, in the embodiment shown, comprises a series-capacitor and a cross resistor, as shown diagrammatically.

The input of output stage 13 has also connected to it, through an attenuator 19, the carrier oscillator 6 for the transmission of a pilot signal of carrier frequency (1,850 c./s.) which is transmitted through transmission line 1, together with the frequency spectra, modulated on the carrier, of the pulses to be transmitted for further use at the receiver. More particularly, due to the modulation process at the outputs of the amplitude modulators 7, 8, sidebands occur in the frequency ranges from 500 to 1,800 c./s. and from 1,900 to 3,200 c./s., the frequency range from 1,800 to 1,900 c./s. being free of pulse components at the area of the pilot signal due to the suppression of the direct-current components of the two pulse series in the networks 17, 18, so that the co-transmitted pilot signal is not influenced in phase and amplitude by the transmitted pulse components. In the embodiment shown, the pilot signal leads by 45° relative to the carrier oscillation of one pulse series and lags by 45° relative to the other.

In the described pulse transmission system it is thus ensured that for the transmission of the two pulse series of 2,250 baud only one frequency band of 2,700 c./s. is used, corresponding to a pulse information of 1.7 baud per c./s. of bandwidth.

FIGS. 3a to 3d show several time diagrams for further explanation of the operation of the transmitting device of FIG. 1.

Figure 3:
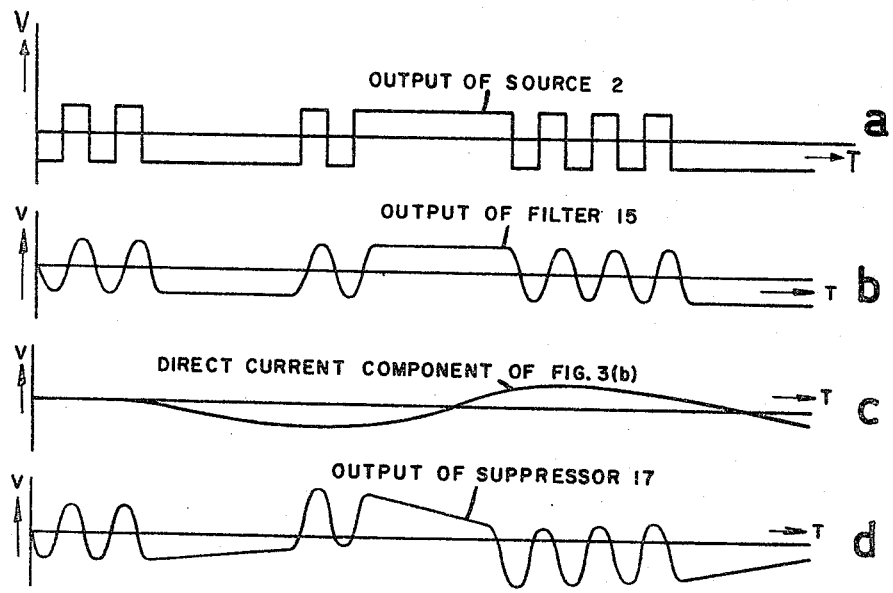
FIGS. 3, 4 and 5 show several time diagrams which serve to explain the transmitting and receiving devices of FIGS. 1 and 2.

FIG. 3a shows the telegraph pulses emitted by the pulse source in one transmission channel, for example transmission channel 4, FIG. 3b showing the pulses, the higher pulse components of which are suppressed in low-pass filter 15.

FIG. 3c shows the direct-current component of the telegraph pulses which is suppressed by network 17 and varies slowly, the variation of the direct-current component being determined by the variation of the damping and phase characteristic of network 17 in the vicinity of the direct-current term. The asynchronous telegraph pulses applied as a modulating voltage to amplitude modulator 7 for the transmission through transmission line 1, are then obtained by subtracting the direct-current component shown in FIG. 3c from the pulse series shown in FIG. 3b, thus resulting in the pulse series shown in FIG. 3d. Similarly, the telegraph pulses provided by pulse source 3 are applied to amplitude modulator 8 for modulating the carrier oscillation, the two pulse series thus modulated on the same carrier oscillation and provided by the two amplitude modulators 7, 8 being applied to the output stage 13 for further transmission through transmission line 1.

The carrier oscillation is transmitted as a pilot signal through transmission line 1, together with the pulse series modulated on the carrier oscillation and having side-bands located in the frequency ranges from 500 to 1,800 c./s. and from 1,900 to 3,200 c./s. The phase and amplitude of the carrier oscillation, as previously mentioned, is not influenced by the pulse components. During the transmission of these signals through transmission line 1 the firm phase relationship of the pilot signal relative to the two pulse series was found to be retained without any effect from the transmission path and the components of the transmitted pulse signals. Furthermore, the variation in the suppression of the direct-current component of the transmitted pulses, transposed to the carrier frequency, was found to be quite independent of the transmission path. In fact, an investigation has shown that these transmission properties are attributable to the damping characteristic and the linearity of the phase characteristic of transmission line 1 being substantially independent of frequency at the area of the carrier frequency in the transmission band and in the direct vicinity thereof.

It has thus been made possible, with substantial elimination of the transmission path designed, for example, for speech communication, to reconstruct the pulse series emitted by the pulse sources 2, 3 free from distortion at the receiving end with the very high pulse information of 1.7 baud per c./s. of bandwidth.

FIG. 2 shows a receiver for receiving signals from the transmitter of FIG. 1.

The signals received through transmission line 1, comprising the two amplitude-modulated pulse series having side-bands located in the frequency ranges from 500 to 1,800 c./s. and from 1,900 to 3,200 c./s. and the co-transmitted pilot signal of carrier frequency (1,850 c./s.), which leads by 45° relative to the carrier oscillation of one pulse series and lags of 45° relative to that of the other, are jointly applied through smoothing networks 20, 21 for smoothing the phase and amplitude characteristics to a stage 22 in which the incoming signals, after amplication and, if desired, frequency transposition, are applied in parallel combination to two receiving channels 23, 24. In addition, a variable damping network 25 for level control is included between the smoothing networks 20, 21 and the stage 22, the damping of network 25 being controlled by a control voltage applied through a line 26 in a manner to be described further hereinafter.

For demodulating the individual amplitude-modulated pulse series having sidebands located in the frequency ranges from 500 to 1,800 c./s. and from 1,900 to 3,200 c./s., the receiving channels 23, 24 include demodulating devices 27, 28 in the form of mixing stages, for example ring modulators. The demodulators are connected through phase-shifting networks 29, 30 leading by 45° and lagging by 45° respectively to a common local carrier oscillator 31. The frequency and phase of the local oscillator oscillations are stabilized on the incoming pilot signal. Since the local carrier oscillations supplied to the demodulating devices 27, 28 through the phase-shifting networks 29, 30 leading by 45° and lagging by 45° respectively are exactly co-phasal with the carrier oscillations associated with the incoming amplitude-modulated pulse series, the demodulated individual pulse series in the frequency ranges from 50 to 1,350 c./s. occur at the output circuits of the two demodulating devices 27, 28 and are derived for further use from separating amplifiers 39, 40 through low-pass filters 32, 33 having a limiting frequency of, for example 1,350 c./s.

The filters 32, 33 have steep damping edges, on the one hand for suppressing interference components in the transmission path and, on the other hand, for suppressing signal components located outside the information band, which have undergone unwanted phase shifts in the transmission path.

The pulses originating from transmission channel 4 occur, for example, at the output circuit of demodulating device 27 and the pulses originating from transmission channel 5 occur at the output circuit of demodulating device 28. This results in separate demodulation of the two pulse series which jointly contain a pulse information of 1.7 baud per c./s. The demodulation process has been found to be substantially not effected by pulse components and the transmission path. Such effect would become manifest by pulse distortions and mutual crosstalk of the demodulated pulse series. In one practical embodiment, for example, the sum of the distortion level and the crosstalk level was less than −26 db relative to the pulse level, which may be regarded as unimportant for pulse transmission.

In the described device, the phase stabilisation of the local carrier oscillator 31 on the pilot signal of 1,850 c./s. as required for the demodulation process is accomplished by utilising the demodulating devices 27, 28 which are already employed for demodulating the amplitude-modulated pulses. The output circuits of the demodulating devices 27, 28 are also connected to low-pass filters 34, 35. The output voltages of these filters are applied to a difference producer 36 which provides a control voltage for a frequency corrector 37, for example a variable reactance. The frequency connector 37 is connected to the local carrier oscillator 31. The frequency of the low-pass filters 34, 35 is chosen to be considerably lower than the lowest pulse component transmitted, this limiting frequency being, for example, 0.1 c./s.

In fact, in this arrangement, by mixing the pilot signal in the demodulating devices 27, 28 formed as mixing stages with the local carrier oscillations supplied thereto through the phase-shifting networks 29, 30 leading by 45° and lagging by 45°, respectively, voltages dependent upon the mutual phase relation of said signals are produced across the outputs of the low-pass filters 34, 35. These voltages exactly stabilize the local carrier oscillator 31, after subtraction in a difference producer 36, on the phase of the pilot signal by means of frequency corrector 37. When the phase of the local carrier oscillator 31 is stabilized with the pilot signal, the phase differences between the pilot signal and the carrier oscillation in the two mixing stages 27, 28 is equal to 45° and hence the output voltages of the low-pass filters 34, 35 are the same. These output voltages then do not cause readjustment of the phase of local carrier oscillator 31 since they compensate one another in difference producer 36. An exact phase stabilisation of local carrier oscillator 31 is thus obtained. If, for example, a phase variation in the stabilized condition of local carrier oscillator 31 occurs the output voltage of one demodulating device increases and that of the other decreases in accordance with this phase variation, resulting in the production of a control voltage which depends upon the magnitude and polarity of this phase variation due to subtraction in difference producer 36. This voltage restores the local carrier oscillator 31 to its stabilized state by means of frequency corrector 37.

The demodulating devices 27, 28 are used not only for demodulating the individual pulse series and for stabilizing the phase of local carrier oscillator 31, but also for producing a level control voltage for controlling the variable damping network 25. In fact, the magnitude of the direct voltage resulting from mixture of the local carrier oscillation and the pilot signal in the demodulating devices 27, 28 also depends upon the magnitude of the pilot signal, thus resulting in direct voltages across the outputs of low-pass filters 34, 35 which are directly suitable for level control. More particularly, in the embodiment shown, the direct voltage developed across the output of low-pass filter 34 is applied as a level control voltage to the damping network 25 by way of a separating amplifier 38.

In this arrangement the three functions of demodulation of the individual pulse series, phase stabilisation of local carrier oscillator 31 and level control are combined without mutual effects. That is to say the arrangement according to the invention in the specified form provides the possibility of a noticeable economy in equipment.

Instead of deriving the level control voltage directly from the output of low-pass filter 34, it is advantageous especially in wireless transmission to derive the level control voltage from a separate low-pass filter directly from the output of demodulating device 27 since the limiting frequency of said filter may thus be considerably higher, for example a factor of 10, so that rapid variations in level resulting from fading phenomena may be suppressed.

Figure 4:
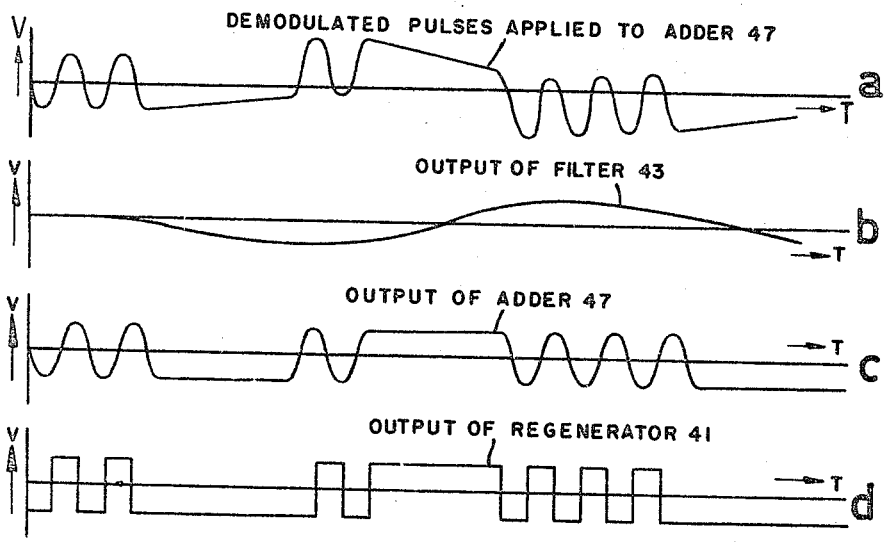

FIG. 4a shows a time diagram of the demodulated pulses derived, for example, from demodulating device 27 having a waveform corresponding to the pulse series with suppressed direct-current component shown in FIG. 3d which was applied by the transmitter and as a modulating voltage to amplitude modulator 7. Similarly, the waveform of the pulse series derived from demodulating device 28 corresponds to the modulating voltage of amplitude modulator 8 at the transmitter.

In order to restore the original pulse series from the demodulated pulses with suppressed direct-current component, pulse regenerators 41, 42, for example in the form of bistable pulse generators, are connected to separating amplifiers 39, 40 in the receiving channels. The output and input circuits of the pulse regenerators are interconnected by feedback networks in the form of low-pass filters 43, 44 respectively having time constants equal to those of the networks 17, 18 for suppressing the direct-current component as used in the transmission channels. More particularly each of the low-pass filters 43, 44 comprises a series-resistor and a cross capacitor, as shown diagrammatically.

Upon occurrence of each pulse, the pulse regenerators 41, 42 in the form of bistable pulse generators are exited, resulting in a regenerated pulse being produced in each output circuit. These pulses are applied, on the one hand, to registers 45, 46 and, on the other, to the low-pass filters 43, 44. The low-pass filters 43, 44 provide direct voltages which vary, due to smoothing, with the direct-current component of the pulses applied thereto. These direct voltages are added in adders 47, 48, at the inputs of the pulse regenerators 41, 42, to the demodulated pulses with suppressed direct-current component of FIG. 4a. The waveform of the varying direct voltages across the outputs of the low-pass filters 43, 44 is shown in FIG. 4b.

The fact that the process of suppressing the direct-current component of the transmitted pulses was found to be substantially not affected by the transmission path, makes it possible exactly to restore the direct-current component in the low-pass filters 43, 44 suppressed at the transmitting end and, subsequently, to reproduce the transmitted pulses free from distortion. More particularly the direct voltage shown in FIG. 4b, with the specified proportioning of the low-pass filters 43, 44, shows exactly the variation of the direct-current component suppressed at the transmitting end, of the pulse series shown in FIG. 4a, the summation of said direct voltage and the pulses of FIG. 4a resulting in the pulse series shown in FIG. 4c which is applied for pulse regeneration to the pulse regenerators 41, 42. If the response level of the pulse regenerator is adjusted in the usual manner to the half peak-to-peak value of the pulses applied thereto, as shown by the abscissa in FIG. 4c, the regenerated pulses shown in FIG. 4d result which are applied for further use to the registers 45, 46.

In the specified pulse transmission system, which is designed for a pulse information of 1.7 baud per c./s. of bandwidth, it has been found that the effect on the pulse transmission by the transmission path and mutual interference of the two pulse series do not occur to any substantial extent. For example, in distortion measurements by comparison of the pulses of FIG. 4d applied the the registration equipments 45, 46 with the pulses of FIG. 3a provided by the pulse sources 2, 3 a distortion level of about —26 db was measured, which in practice may be considered as unimportant for pulse transmission. In addition to the exceptionally high pulse information of 1.7 baud per c./s. of bandwidth, the equipment employed is particularly simple and its adjustment is not particularly critical; for example no particular requirements need be imposed upon the smoothing networks 20, 21, and the equipment is very flexible in its use. Thus, the described transmission system may be employed for the transmission of several types of pulses, for example asynchronous telegraphy, synchronous telegraphy, pulse code modulation, and is serviceable for transmission both via lines and by wireless means without taking special steps.

Figure 5:
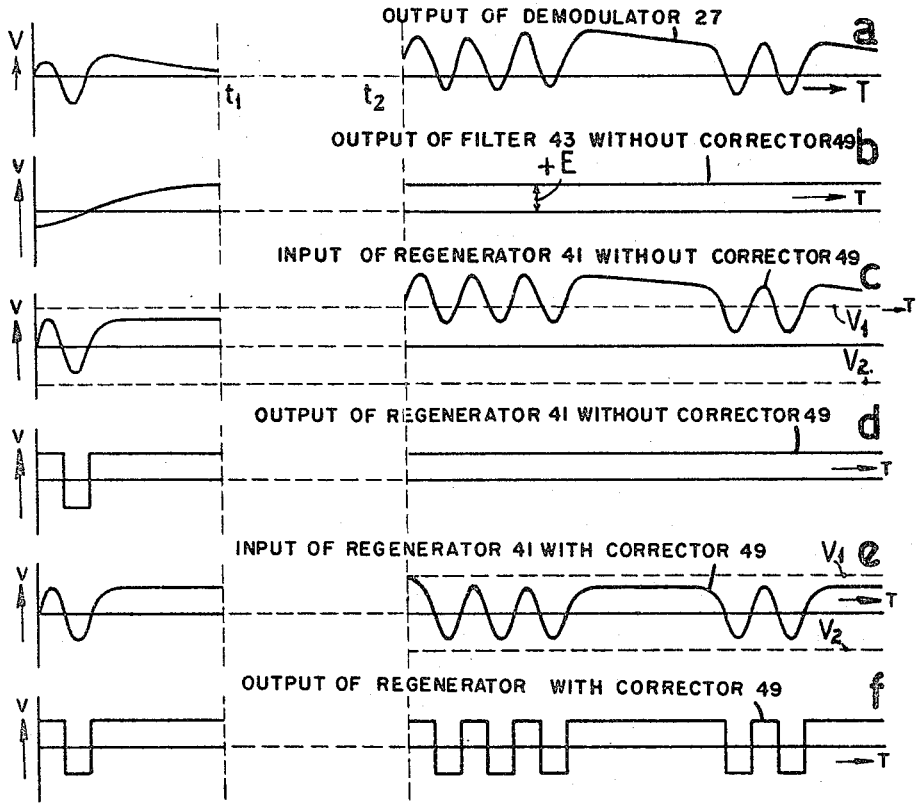

The insensitivity of the specified transmission system to noise and interference may in general be regarded as very favourable, but under special conditions, more particularly after prolonged interruptions in operation, for example in case of a defect in the line, an undesirable operating condition may occur due to the back-coupling between the outputs and inputs of the pulse regenerators 41, 42 through the low-pass filters 43, 44, so that the proper operation of the arrangement after the interruption in operation is over may be disturbed, as will be explained more fully with reference to the time diagrams shown in FIG. 5.

FIG. 5a shows, for example, the pulses set up at demodulator 27, an interruption in operation occurring between the instants $t_1$–$t_2$, as shown in broken line. During this interruption in operation there is no transmission of pulses.

FIG. 5b shows the direct voltage across the output of low-pass filter 43, which, in the example shown, is higher at the moment $t_1$ of the interruption in operation than the response voltage of pulse regenerator 41, indicated by the abscissa. In other words, the pulse regenerator 41 is maintained in the response condition during the period of interruption $t_1$–$t_2$. The direct voltage which exists at the output of low-pass filter 43 during the period of interruption $t_1$–$t_2$ will thus adjust itself to its maximum value which is then equal to the positive peak value E of the pulsed voltage.

FIG. 5c shows the summation of the pulsed voltage of FIG. 5a and the direct voltage of FIG. 5b in a adder 47, which sum voltage is applied to pulse regenreator 41. Since this sum voltage, after the period of interruption, constantly lies above the response level of pulse regenerator 41 the pulses then occurring do not act upon pulse regenerator 41 due to its being already in the response condition after the period of interruption.

FIG. 5d shows the pulses derived from pulse regenerator 41, from which it appears that the pulses transmitted after the period of interruption are not reproduced.

As has been explained with reference to FIGS. 5a to 5d, in the example shown, the voltage of low-pass filter 43, which is higher at the instant of interruption $t_1$ than the response level of pulse regenerator 41, is brought to its maximum value $+E$ during the period of interruption $t_1$-$t_2$ due to the feedback circuit in pulse regenerator 41, thus involving the risk that the pulses received after the period of interruption is over are no longer transmitted. On the other hand, if the output voltage of low-pass filter 43 is lower at the moment of interruption $t_1$ than the response level of pulse regenerator 41, it decreases during the period of interruption to its minimum value equal to the negative peak value $-E$ of the pulses, thus resulting in a similar manner as previously explained in the risk that the pulses occurring after this period will not be transmitted.

In order to obviate this undesirable operating condition after a prolonged interruption in operation without affecting the proper operation of the arrangement in the normal operating position, the receving channels 23, 24 of the described arrangement include corrector circuits 49, 50 between the adders 47, 48 and the inputs of the pulse regenerators 41, 42. The corrector circuits comprising series-capacitors 53, 54 bridged by resistors 51, 52 and two parallel branches including diodes 55, 56 and 57, 58 having opposite conducting directions. The diodes 55, 56 and 57, 58 are cut off by blocking voltages 59, 60 and 61, 62 of opposite polarities. The blocking voltages 59, 60 and 61, 62 are at least equal to the maximum and the minimum value respectively of the direct output voltages of the low-pass filters 43, 44 and are, in the example shown, at least $+E$ and E, respectively. The blocking voltages are shown for the sake of clarity by broken lines $V_1$ and $V_2$ in FIG. 5c.

In the embodiment shown, the corrector circuits 49, 50 in the normal operating condition do not act upon the pulses applied thereto through the adders 47, 48, since the blocking voltages of the diodes 55, 56 and 57, 58 are then not exceeded by the voltages originating from the adders 47, 48, the diodes 55, 56 and 57, 58 thus remaining cut off. For example, if the voltage of adder 47, shown in FIG. 5c, is applied through corrector circuit 49 to pulse regenerator 41, this voltage will pass corrector circuit 43 without distortion before the instant $t_1$ of the interruption in operation, as shown in FIG. 5c.

However, after the interruption in operation the situation has changed completely, since in FIG. 5c the voltage of adder 47 is then higher than the blocking voltage $V_1$ of diode 56. At the moment when the voltage of the first pulse after the period of interruption exceeds the blocking voltage $V_1$, diode 56 will conduct and series-capacitor 53 will be charged by a negative voltage of a value equal to the difference between the maximum voltage of adder 47 and the blocking voltage $V_1$ of diode 56, with the result that the input voltage of pulse regenerator 41 falls below the response condition and pulse regenerator 41 flops back to its non-responsive condition, as shown in FIG. 5e. Due to this return to the non-responsive condition, the next-following pulses are transmitted by pulse regenerator 41 and the normal operating condition is reached within a short time the voltage set up across low-pass filter 43 becomes equal to the suppressed direct-current component of the incoming pulses, and the capacitor has discharged through its discharge resistor 51. The time constant of the discharge is, for example, 15 msec. To ensure optimum operation of the corrector circuit it is important for the charging constant of capacitor 53 to be as small as possible, more particularly of the order of magnitude of the duration of a pulse. In the example shown it is, for example, 1 msec.

FIG. 5f shows for completeness' sake the pulses derived from pulse regenerator 41 with the use of the corrector circuit 49 described in the foregoing.

If in the described circuit, after the interruption in operation, the output voltages of the low-pass filters 43, 44 have assumed their minimum instead of maximum values, the capacitors 53, 54 will be charged in positive sense due to the conduction of diodes 55, 57. The arrangement is restored to its normal operating condition within a short period in quite the same manner as previously explained.

By the use of the corrector circuits 49, 50 an undesirable operating condition is thus avoided. In the normal operating condition the corrector circuits 49, 50 do not affect the transmission of the incoming pulses. In addition to the advantages of the arrangement according to the invention which have already been obtained, the use of the corrector circuits 49, 50 provides an improvement in the reliability of operation since pulse transmission in the correct manner is always ensured.

Although the invention has been described above with reference to particularly advantageous transmitting and receiving devices which have been tested in practice, other embodiments are possible within the scope of the invention. Thus, for example, instead of the phase-shifting networks 9, 10 leading by 45° and lagging by 45°, phase-shifting networks of other types may be used in the carrier line at the transmitter, provided that the carrier oscillations are modulated with a mutual phase-shift of 90°. It is also possible to accomplish this modulation in another way, for example by using a retarding network of suitable retardation period at the output of one of the amplitude modulators 7, 8.

At the receiver it is, within the scope of the invention, not strictly necessary to use the demodulation stages 27, 28 for phase stabilization of the local oscillator, since it is possible to employ a separate phase-stabilizing circuit. If desired, instead of deriving the local carrier oscillation from local carrier oscillator 31, it may be obtained by selection of the pilot signal in a selective filter and a succeeding amplifier. For the pulse regeneration it is also possible to use a so-called slicer which is constituted, for example, by the combination of a limiter and a threshold device.

Also an adder instead of the difference producer 36 may be used for the phase stabilization by inverting the polarity of the output voltage of demodulating device 28. In this modification, the output voltages of the two demodulating devices 27, 28 are added for the phase stabilization.

Figure 6:
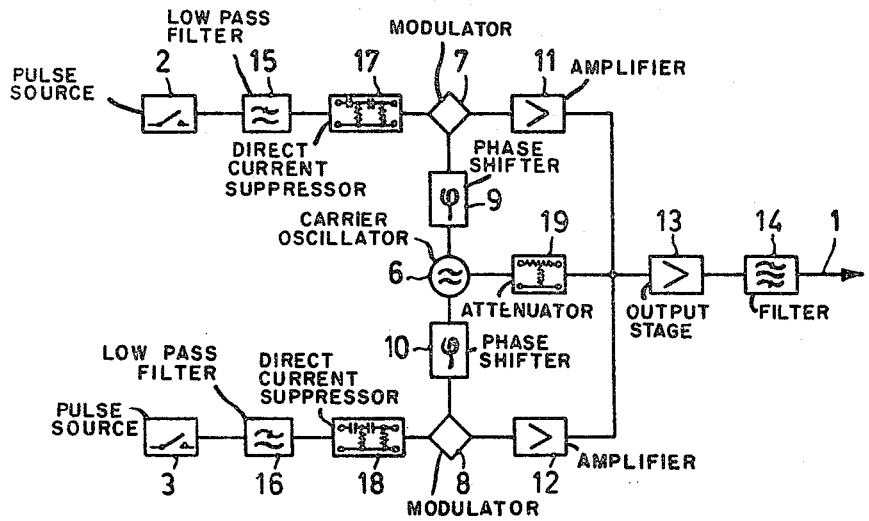
FIGS. 6 and 7 show in greater detail transmitting and receiving devices for a pulse transmission system according to the invention.
Figure 7:
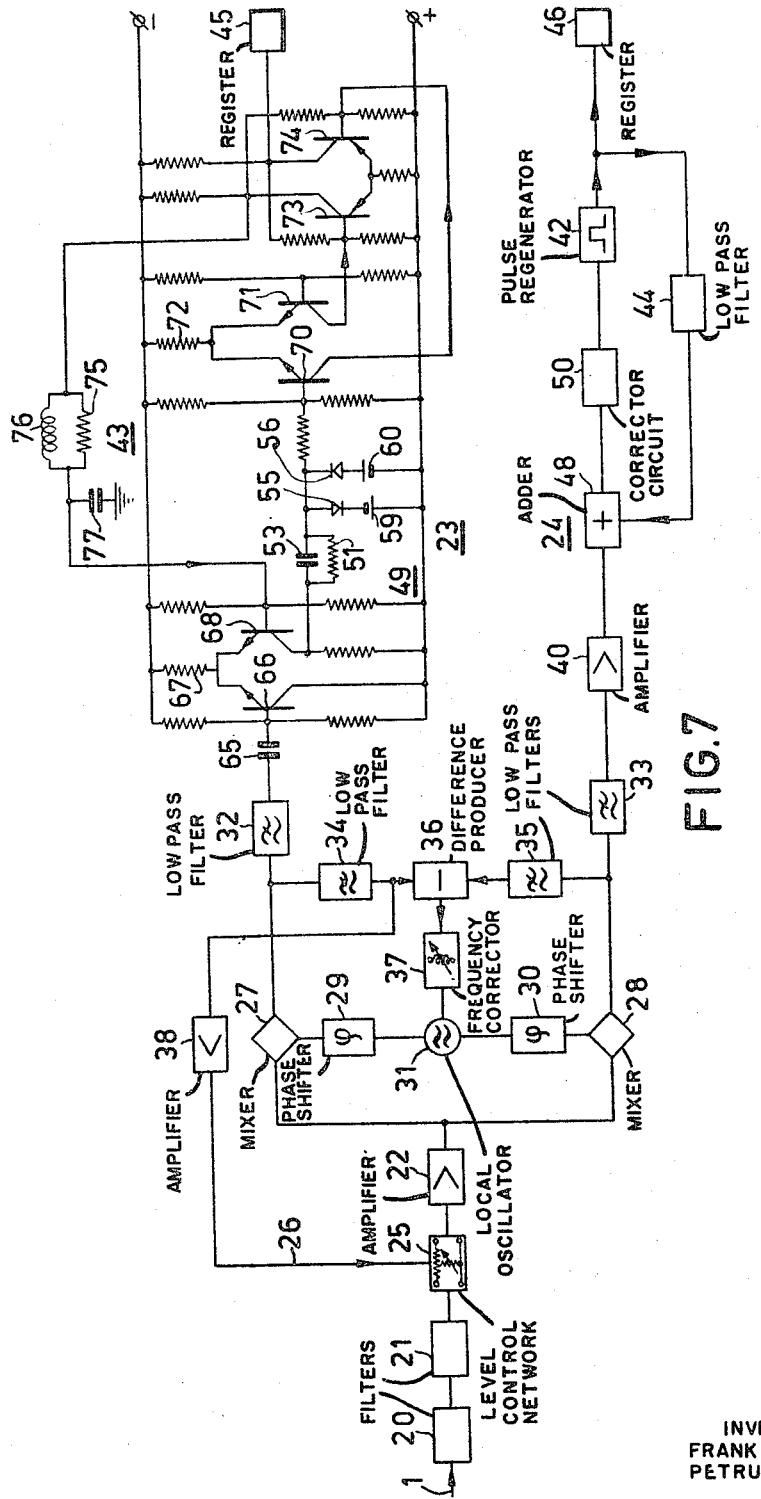

FIGS. 6 and 7 show transmitting and receiving devices of a pulse transmission system according to the invention which have been elaborated in greater detail. Elements corresponding to those in FIGS. 1 and 2 are indicated by the same reference numerals.

The transmitting device shown in FIG. 6 differs from that of FIG. 1 in that the networks 17, 18 for suppressing the direct-current component are of a different design and more particularly comprise the cascade connection of two RC-networks each consisting of a series-capacitor and a shunt resistor. The limiting frequency is 50 c./s. and the two time constants of the complete network 17, 18 are 2.9 msec. and 20 msec. The use of the cascade connection of two RC-networks instead of a single RC-network affords the advantage that interfering pulse components in the vicinity of the pilot signal are suppressed more satisfactorily, with the result that any effect on the pulse transmission by such components is further decreased.

FIG. 7 shows the receiver for receiving signals from the transmitting device of FIG. 6. The design of the pulse regenerator with the transistorized feedback circuit included between the input and output thereof is shown in detail in receiving channel 23. The receiving channel 24, which is shown in block diagram, is identical with receiving channel 23.

In receiving channel 23 the pulses derived from demodulator 27 are applied through a separating capacitor 65 to a separating amplifier comprising a transistor 66 connected as an emitter follower. Transistor 66 has an emitter resistor 67 which is also the emitter resistor of a transistor 68 connected as a voltage amplifier. The output voltage of low-pass filter 43, which is connected to the output circuit of a pulse regenerator is applied to the base of transistor 68.

The sum of the pulses applied to the base of transistor 66 and of the direct voltage applied to the base of transistor 68 then occurs at the collector of transistor 68. This sum voltage is applied to corrector circuit 49 for further use in the pulse regenerator. As previously explained with reference to FIG. 2, corrector circuit 49 comprises a series-capacitor 53 shunted by a resistor 51 and two parallel branches including diodes 55, 56 cut off by blocking voltages 59, 60. The diodes 55, 56 are included in the parallel branches with opposite conducting directions. In the normal operating condition the diodes 55, 56 are cut off, since their blocking voltages 59, 60 are then not exceeded by the sum voltages derived from the collector of transistor 68 so that this sum voltage is not influenced by corrector circuit 49 in the normal operating condition.

The signals derived from the collector of transistor 68 for use in the pulse regenerator are first amplified in a transistor amplifier which, in the embodiment shown, comprises two transistors 70, 71 and a common emitter resistor 72. The amplified signals at the collectors of transistors 70, 71 are in phase opposition and are applied as a control voltage to the pulse regenerator.

In the embodiment shown, the pulse regenerator comprises two transistors 73, 74 connected in the form of a bistable pulse generator and backcoupled in a crosswise manner. More particularly the collector of each transistor is connected to the base of the other transistor.

Either transistor 73 is conducting and transistor 74 is cut off, or transistor 73 is cut off and transistor 74 is conducting, depending upon the control voltages applied in phase opposition through the transistor amplifiers 70, 71 to the bases of the transistors 73, 74. The regenerated pulses appear at the collectors of the transistors 73, 74. More particularly the regenerated pulses at the collector of transistor 74 are applied to the register 45, whereas the regenerated pulses at the collector of transistor 73 are smoothed in low-pass filter 43 to produce a direct voltage which is added by means of transistor 68 to the demodulated pulse series. The low-pass filter 43 comprises a series-coil 76 bridged by a resistor 75 and a shunt capacitor 77, the time constants of which are equal, as in the transmitting and receiving devices shown in FIGS. 1 and 2, to the time constants of the networks 63, 64 employed in the transmitter of FIG. 6 for suppressing the direct-current component of the pulses.

The pulses emitted by the pulse sources 2, 3 of FIG. 6 are reproduced substantially free from distortion in the receiver of FIG. 7 without any effects from the transmission path or pulse components of the transmitted pulses in the manner as previously explained with reference to the transmitting and receiving devices of FIGS. 1 and 2.

As explained above, this object is attained inter alia in that the process of interrupting the direct-current component by the networks 17, 18 at the transmitter on its way to the receiver is not affected by the transmission path and pulse components, so that for the distortionless reproduction of the transmitted signals at the receiver it is made possible exactly to restore the suppressed direct-current components by a suitable design of the low-pass filters 43, 44 in the feedback circuits between the outputs and inputs of the pulse regenerators 41, 42. To this end, an intimate relationship, independent of the transmission path, must exist between the transmission characteristic $\phi_1(\omega)$ and $\phi_2(\omega)$ of the networks 17, 18 and 43, 44 respectively with equal time constants, which relationship will now be deduced in its generality.

If the form of the pulse series from the pulse sources 2, 3, given by its frequency spectrum, is represented by the magnitude V the form of this pulse series, after passing the D.C. component suppressing network 17, 18 having the transmission characteristic $\phi_1(\omega)$, is given by the formula:

$$V\phi_1(\omega) \qquad (I)$$

the pulse series in this network undergoing a change of form:

$$V - V\phi_1(\omega) = V(1 - \phi_1(\omega)) \qquad (II)$$

With a distortionless transmission of these pulses, the initial pulse series V occurs in the corresponding receiving channel at the output of pulse regenerator 41, 42, a voltage $V\phi_2(\omega)$ being added through the low-pass filter 43, 44 having a transmission characteristic $\phi_2(\omega)$ to the demodulated pulse series in the adder 47, 48. This voltage must be exactly equal to the change in form of the pulses in the D.C. component suppressing network 17, 18, for a distortionless transmission, so that:

$$V\phi_2(\omega) = V(1 - \phi_1(\omega)) \qquad (III)$$

From this condition follows immediately the desired relationship between the transmission characteristics $\phi_1(\omega)$ and $\phi_2(\omega)$ of the networks 17, 18, 43, 44 and more particularly:

$$\phi_1(\omega) + \phi_2(\omega) = 1 \qquad (IV)$$

Mathematically it may be deduced that for a given network suppressing the direct-current component of the pulses having a transmission characteristic $\phi_1(\omega)$, an associated low-pass filter having a transmission characteristic $\phi_2(\omega)$ in the feedback circuit of the pulse regenerator may be found, whereby the condition (IV) is fulfilled while avoiding instabilities.

Thus, for example, to the network suppressing the direct-current component of the pulses and comprising a series-capacitor and a shunt resistor as employed in the transmitting device of FIG. 1 belongs the low-pass filter comprising a shunt capacitor and a series resistor as employed in the receiving device of FIG. 2, the data of these networks being specified below:

For the networks 17, 18 in FIG. 1:
    Capacitors _____ μfs__ 8
    Resistors _____ kΩ__ 1

For the networks 43, 44 in FIG. 2:
    Capacitors _____ μfs__ 8
    Resistors _____ kΩ__ 1

Similarly, the networks 17, 18 in the transmitting device of FIG. 6 and the networks 43, 44 in the receiving device of FIG. 7 fulfill the above-mentioned condition in Formula IV, the data of these networks now being:

For the networks 17, 18 in FIG. 6:
    Capacitors _____ μfs__ 8
    Resistors _____ kΩ__ 1

For the networks 43, 44 in FIG. 7:
    Inductor 76 _____ H__ 8
    Resistor 75 _____ ohms__ 330
    Capacitor 77 _____ μfs__ 8

For the sake of completeness it should be noted here that the sequence of the networks 15, 16 and 17, 18 at the transmitting end may be reversed, or each pair of networks 15, 16 and 17, 18 may be united to form a single network. Instead of suppressing the direct-current component of the transmitted pulses by the filter networks 17, 18, this may alternatively be effected by means of cut-off filters included in the output circuits of the amplitude modulators 7, 8 and which suppress the carrier frequency and spectrum components located in direct proximity thereof, of the pulses modulated on the carrier frequency.

Figure 8:
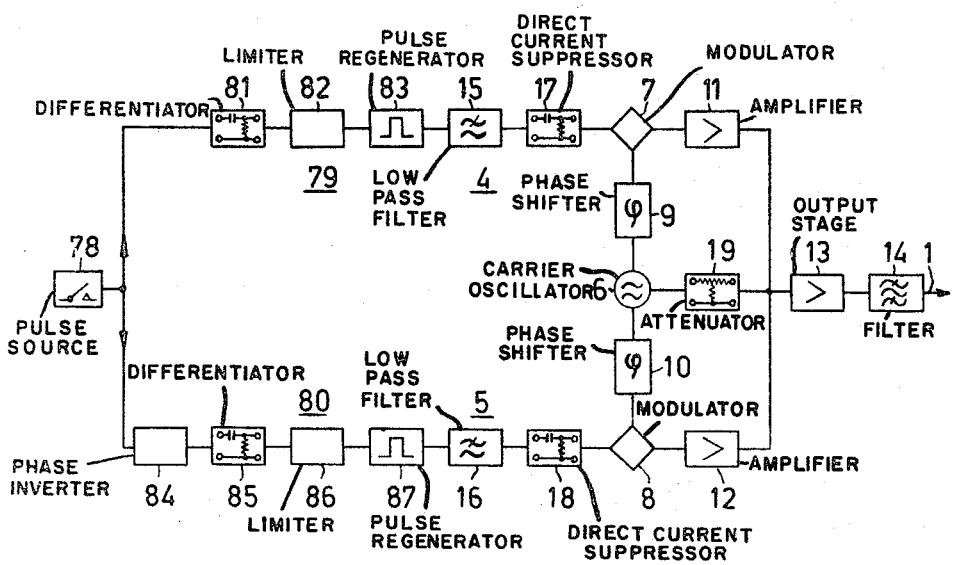
FIGS. 8 and 9 show transmitting and receiving devices according to the invention, designed for the transmission of signals from a single pulse source, FIGS. 10 and 11 showing several corresponding time diagrams.
Figure 9:
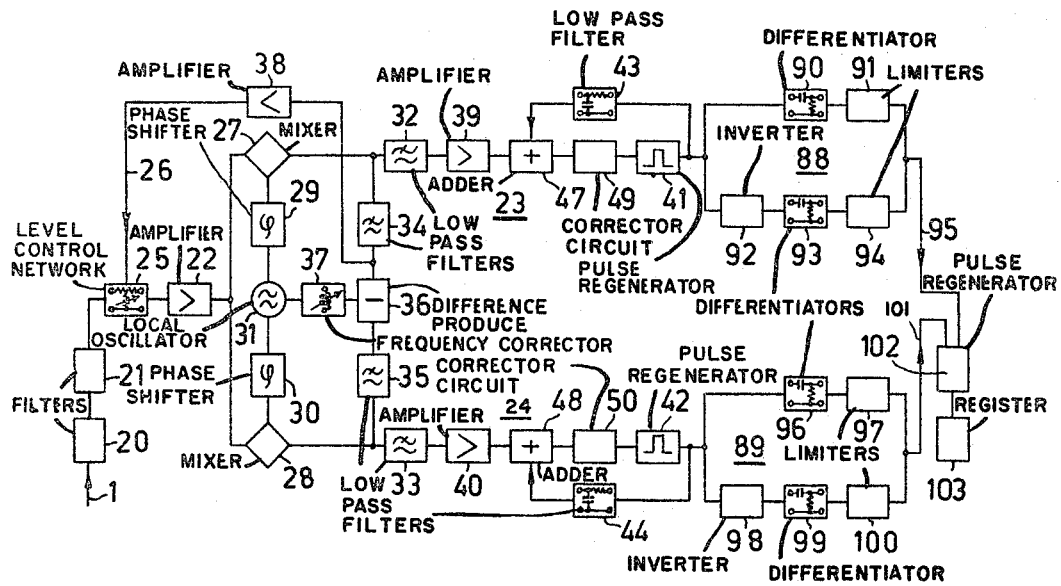

FIGS. 8 and 9 show further embodiments of transmitting and receiving devices according to the invention. Corresponding elements are indicated by the same reference numerals.

In the foregoing embodiments the transmitting devices and the receiving devices co-acting therewith are designed for the transmission, over a transmission band of 2,700 c./s., of pulse signals provided by two independent pulse sources 2, 3 each with a transmission velocity of 2,250 baud, corresponding to a pulse information of 1.7 baud per c./s. of bandwidth. Instead of the transmission of pulses provided by two independent pulse sources 2, 3 each with a transmission velocity of 2,250 baud, the transmission system according to the invention may alternatively be used for the transmission of pulses from only one pulse source 78 which in this case may have double the pulse velocity or 4,500 baud.

Figure 10:
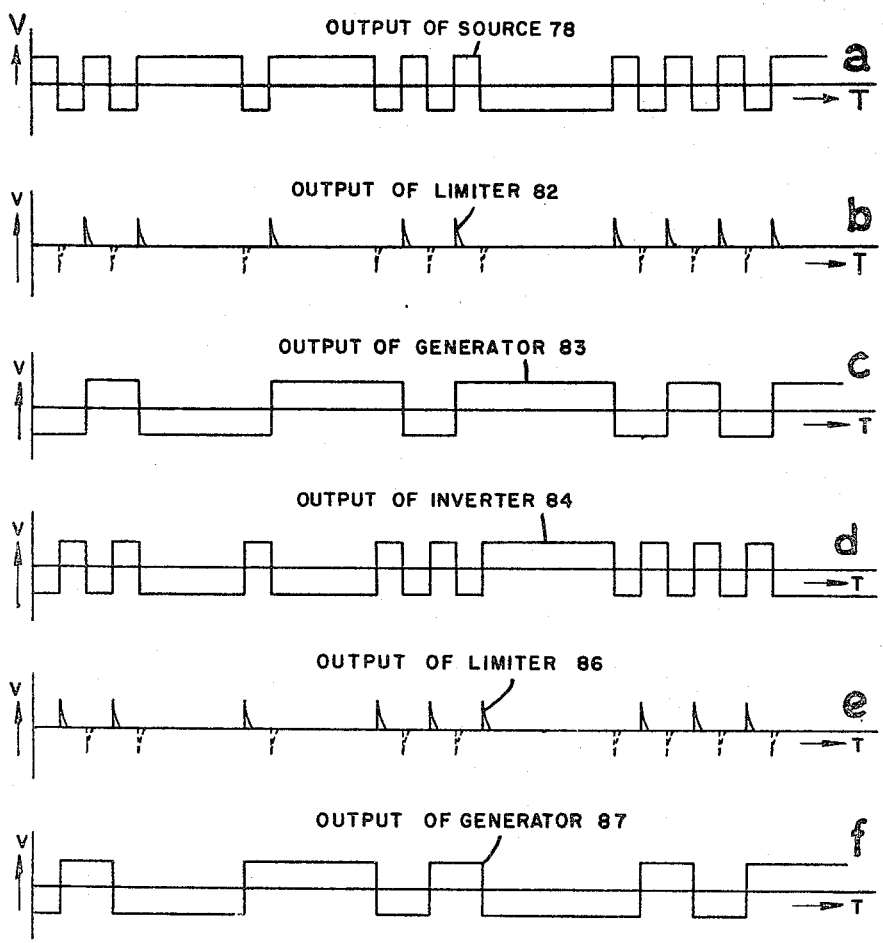
Figure 11:
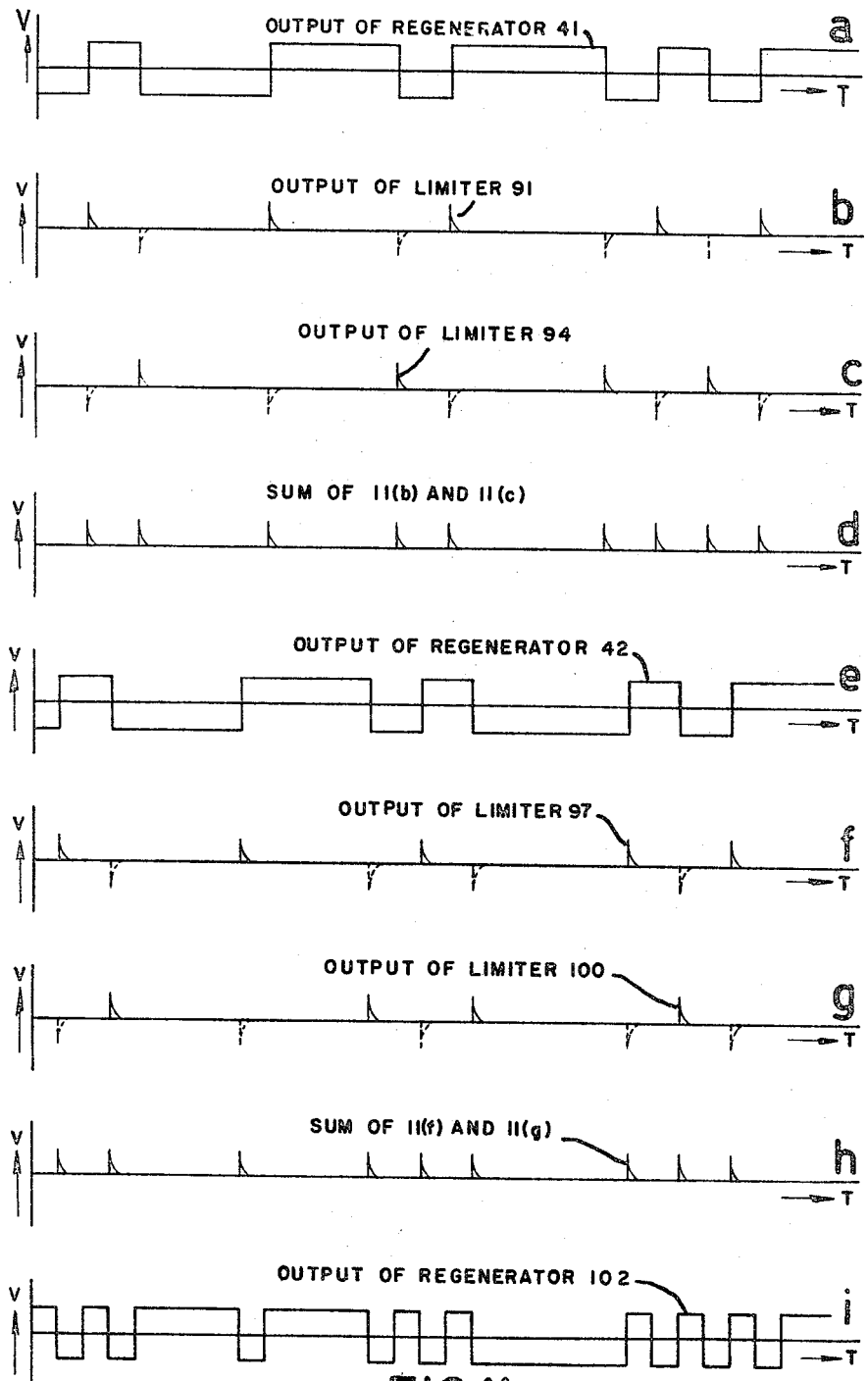

To this end, in the transmitting device shown in FIG. 8, the original pulse series of 4,500 baud provided by pulse source 78 is converted into two pulse series each of 2,250 baud which are transmitted through the transmission channels 4, 5 to the receiving device, the pulse series each of 2,250 baud derived at the receiving end from the output circuits of the pulse regenerators 41, 42 in the receiving channels 23, 24 being reconverted into the original pulse series of 4,500 baud in the manner as will now be explained with reference to the time diagram shown in FIGS. 10 and 11.

In order that the pulses of a transmission velocity of 4,500 baud provided by pulse source 78, which pulses are shown in the time diagram of FIG. 10a, may be converted into two pulse series each of 2,250 baud, said pulses are applied in parallel combination to two converting channels 79, 80 which are connected to transmission channels 4, 5 for the transmission to the receiving device.

In converting channel 79 the pulse series shown in FIG. 10a is applied to a differentiating network 81 for producing the pulse series shown in FIG. 10b, which, after the negative pulses shown in dotted line have been suppressed in a limiter 82, are applied to a bistable pulse generator 83. Upon each positive pulse of FIG. 10b the bistable pulse generator 83 is changed from one balanced condition to the other, resulting in the pulse series shown in FIG. 10c with half the transmission velocity of 2,250 baud, which is transmitted through transmission channel 4 to the receiving device. As may appear from FIG. 10c, the leading edges only of the pulses shown in FIG. 10a are characterized by said pulse series.

In converting channel 80 a pulse series is produced which characterizes only the trailing edges of the pulses from pulse source 78. To this end, the pulses of FIG. 10a are first inverted in phase in a phase-inverting stage 84, the resulting pulse series (FIG. 10d) being handled in the same manner as in converting channel 79. More particularly these pulses, after differentiation in a differentiating network 85 and after the negative pulses, shown in dotted lines in FIG. 10e have been suppressed in a limiter 86, are applied to a pulse regenerator 87 for producing the pulse series shown in FIG. 10f, which is transmitted through transmission channel 5 to the receiving device.

The pulse series shown in FIGS. 10c and 10f have half the transmission velocity of the initial pulse series of FIG. 10a, but jointly contain the complete information of the initial pulse series of FIG. 10a, since they characterize both the leading and trailing edges thereof. The original pulse series of FIG. 10a having a transmission velocity of 4,500 baud may then be restored from the two pulse series of FIGS. 10c and 10f in a converting device at the receiving end, as will now be explained with reference to the time diagrams shown in FIG. 11.

In the receiving device shown in FIG. 9, the pulse series corresponding to FIGS. 10c and 10f occur at the pulse regenerators in the receiving channels 23, 24, these two pulse series being applied to two converting channels 88, 89 for restoring the initial pulse series. For the sake of completeness, FIGS. 11a and 11e show the pulses set up at the output circuits of the pulse regenerators 41, 42 and which correspond to the pulse series illustrated in FIGS. 10c and 10f.

In converting channel 88 connected to pulse regenerator 41, the pulses of FIG. 11a originating from pulse regenerator 41 are applied, on the one hand, directly to the cascade connection of a differentiating network 90 and a limiter 91 and, on the other hand, through a phase-inverting stage 92 to a cascade connection of a differentiating network 93 and a limiter 94. The output circuits of the limiters 91, 94 are connected in parallel to a common output line 95. Differentiation of the pulse series of FIG. 11a in differentiating network 90 results in the pulse series of FIG. 11b, the negative pulses of which, shown in dotted line, are suppressed in limiter 91, whilst phase inversal of the pulse series of FIG. 11a in phase-inverting stage 92 and subsequent differentiation thereof in differentiating network 93 results in the pulse series of FIG. 11c, the negative pulses of which, shown in dotted lines, are suppressed in limiter 94. Summation of the pulse series of FIGS. 11b and 11c results in the pulse series of FIG. 11d occurring at the common output line 95. This pulse series characterizes the leading edges of the initial pulses of FIG. 10a.

Similarly in converting channel 89, the pulses of FIG. 11a originating from the pulse regenerator are applied, on the one hand, directly to the cascade connection of a differentiating network 96 and a limiter 97 and, on the other hand, through a phase-inverting stage 98 to a cascade connection of a differentiating network 99 and a limiter 100. The pulse series shown in FIGS. 11f and 11g then occur at the output circuits of the limiters 97, 100. The negative pulses of these series, shown in dotted line, are suppressed in the limiters 97, 100 and the summation of these two pulse series appears in the common output line 101, resulting in the pulse series of FIG. 11a which characterize the trailing edges of the initial pulses of FIG. 10a.

To restore the initial pulse series of FIG. 10a from the pulses of FIGS. 11d and 11h in the output lines 95, 101, these pulses are applied to a bistable pulse generator 102 which passes to one balanced condition upon the occurrence of a pulse from output line 95 (FIG. 11d) and to the other balanced condition upon a pulse from output line 101. FIG. 11i shows the output pulses from pulse generator 102, which, as may appear from the figure, correspond to the initial pulse series of FIG. 10a and are applied to the register 103.

By using the steps according to the invention it is thus rendered possible by pulse conversion to transmit the pulses from a single pulse source 78 with a transmission velocity of 4,500 baud over a band of 2,700 c./s. Briefly stated, according to this arrangement, in the two parallel connected conversion channels 79, 80 at the transmitter, two pulse series (FIGS. 10c and 10f) are produced which characterize only the leading edges and the trailing edges respectively. At the receiver pulses (FIGS. 11d and 11h) corresponding to the leading and trailing edges of the initial pulse series are produced from the two emitted pulse series in the two conversion channels 88, 89. These pulses control, by way of separate lines 95, 101, the bistable pulse generator 102 in order to restore the initial pulse series (FIG. 11i).

Figure 12:
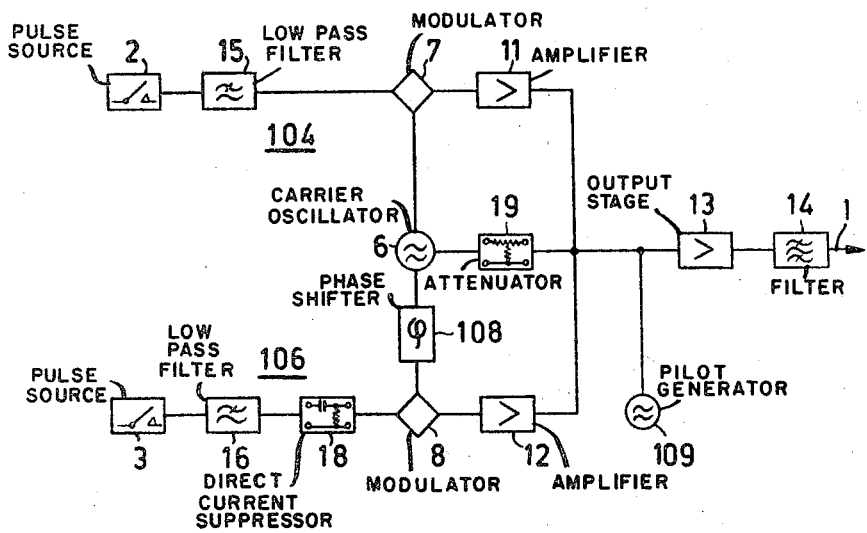
FIGS. 12 and 13 show transmitting and receiving devices according to the invention, obtained by extension of a telegraph channel designed for normal amplitude modulation.
Figure 13:
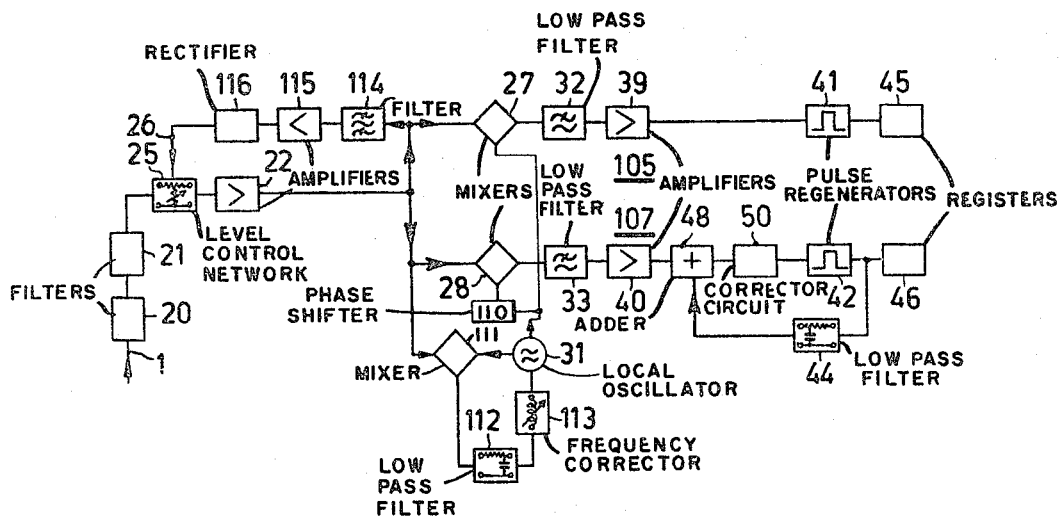

FIGS. 12 and 13 show another use of the arrangement according to the invention, the object in this case being more particularly to render an existing telegraph channel 104, designed for the transmission of amplitude-modulated telegraph pulses, by taking the steps according to the invention, suitable for the transmission of a greater pulse information per c./s. of bandwidth. FIG. 12 shows the diagram of the transmitting device and FIG. 13 the diagram of the co-acting receiver.

At the transmitter (FIG. 12) the telegraph channel 104 designed for normal amplitude-modulated telegraph pulses comprises a pulse source 2, a low-pass filter 15 for suppressing frequency components located slightly above the half pulse frequency, and an amplitude modulator 7, for example a push-pull modulator in the form of a ring modulator, which is connected to a carrier oscillator 6. The output pulses are applied by way of an amplifier 11 and an output stage 13 including an output filter to a transmission line 1.

At the receiver (FIG. 13) the incoming signals are applied through smoothing networks 20, 21 for smoothing the amplitude-frequency and the phase-frequency characteristics to an input stage 22 which is connected to an amplitude demodulator 27. The demodulated pulses are applied by way of an output filter 32 and an amplifier 39 to a pulse regenerator 41 which is connected to a register 45. The telegraph channel 104, 105, so far described and designed for the transmission of amplitude-modulated telegraph pulses is known per se and needs no further explanation.

To increase the pulse information, the specified telegraph transmission system comprises a second channel 106, 107 which is designed in the manner as previously explained. More particularly the channel 106 includes at the transmitter (FIG. 12) a pulse source 3, a low-pass filter 16 for suppressing pulse components located slightly above half the pulse frequency, and a network 18 for suppressing the direct-current component of the pulses. The output voltage of network 18 is applied as a modulating voltage to an amplitude modulator 8, which is connected by way of an amplifier 12 to the output stage 13. The carrier oscillator 6 is also connected through a 90° phase-shifting network 108 to the amplitude modulator 8 so that, as before, the oscillations originating from the common carrier oscillator 8, are modulated in the two amplitude modulators 7, 8 with a mutual phase shift of 90°. The carrier oscillator 6 is connected by way of an attenuator 19 to the input of output stage 13 for the transmission of the pilot signal of carrier frequency.

In contrast to the arrangements so far described, the direct-current component of the telegraph pulses applied to push-pull modulator 7 in transmission channel 104 is not suppressed, so that in this arrangement a carrier voltage varying in the rhythm of the telegraph pulses occurs across the output of push-pull modulator 7 and is superimposed in phase on the pilot signal derived from carrier oscillator 6 through attenuator 19.

Since the phase of the pilot signal is independent of the telegraph pulses, the pilot signal may be used for phase synchronisation of a local carrier oscillator 31 at the receiver. This pilot signal is not suitable for level control since its amplitude, in contrast to its phase, is affected by the telegraph signals from channel 104. For the level control in this arrangement a separate pilot signal generator 109 is used for producing a frequency located outside the transmission band, for example a frequency of 400 c./s., which is transmitted via the output stage 13, together with the other signals from the transmitting device, to the receiving device in FIG. 13.

To restore the signals provided by pulse source 3 in the second transmission channel 106, the receiving device of FIG. 13 includes a second receiving channel 107 which is connected to the input stage 22 and includes successively a demodulator 28 having an output filter 33, a separating amplifier 40 and a pulse regenerator 42, which controls a register 46. As in the arrangements previously described, the output circuit of pulse regenerator 42 has connected to it a low-pass filter 44 the output voltage of which is added to the demodulated pulses in adder 48 for producing a sum voltage which is applied through a corrector circuit 50 to pulse regenerator 42.

The receiving device described also comprises a local carrier oscillator 31 which is exactly stabilized on the phase of the pilot signal. The output voltage of the oscillator is applied with the correct phase to the demodulating devices 27, 28 for separate demodulation of the two pulse series. To this end, the oscillator 31 is connected, on the one hand, directly to demodulating device 27 and, on the other hand, through a 90° phase-shifting network 110 to demodulating device 28. The required stabilisation of the local carrier oscillator 31 is obtained by mixing the signals originating from input stage 22 and the oscillator voltage in a mixing stage 111, which fulfills the function of a phase detector, and applying the output voltage thereof through a low-pass filter 112 having a limiting frequency of 0.1 c./s. to a frequency corrector 113 connected to the local carrier oscillator.

The level control in the specified arrangement is effected by selecting the pilot signal of 400 c./s. occurring at the output of input stgae 22 in a selecting filter 114 and, after amplification in an amplifier 115, rectifying it in a rectifier stage 116 for producing a level control direct voltage. This voltage is applied as a control voltage to a variable damping network included in transmission line 1 by way of line 26.

In a telegraph channel designed for the transmission of amplitude-modulated telegraph signals it is thus possible indeed to increase the pulse information per c./s. of bandwidth by using the steps according to the invention, but this arrangement is on the other hand, apart from its structure which is much less attractive than that of the arrangements described hereinbefore, also less favourable with regard to its transmission properties. More particularly its sensitivity to interference is considerably greater and, for example, the power emitted must be increased by a factor of 3 to 4 as compared with the arrangements described hereinbefore, to obtain the same insensitivity to interference, and a separate pilot signal for level control located outside the transmission band is also required, together with the equipment necessary therefor.

Under these conditions it may be more desirable to rebuild the arrangements of FIGS. 12 and 13 into arrangements of FIGS. 1, 2; 6, 7 or 8, 9, which are distinguished, in addition to their exceptionally high pulse information of 1.7 baud per c./s. of bandwidth, by their simple and attractive structure, great flexibility and optimum freedom of interference.

The arrangements described hereinbefore are suitable not only for asynchronous telegraphy, but also for the transmission of synchronous telegraphy and pulse code-modulation, wherein the instants of the occurrence of the transmitted pulses are determined by equidistant clock pulses provided by a clock-pulse generator. Transmission systems according to the invention have been elaborated in the following embodiments especially for the transmission of synchronous telegraphy and pulse code-modulation, optimum advantages being obtained by making use of the properties of methods of transmission.

FIGS. 14 and 15 show a transmitter and a receiver respectively for the transmission of synchronous telegraphy or pulse code-modulation, the operation of the devices shown being explained with reference to the time diagrams of FIGS. 16 and 17.

In the transmitting device shown in FIG. 14 the transmitted signals are derived from signal sources 117, 118, for example magnetic tape apparatus and an associated clock-pulse generator 119. The signals provided by the signal sources 117, 118 are applied to gate devices 120, 121 which are controlled by the clock pulses and which, upon occurrence of each clock pulse, deliver positive or negative output pulses depending upon whether the signal voltage has a positive or a negative value. The recurrence frequency of the equidistant clock pulses provided by clock-pulse generator 119 is, for example, 2,250 c./s.

If FIG. 16a shows the time diagram of the signals to be transmitted which are provided, for example, from signal source 117 and if FIG. 16b shows the corresponding clock pulses, then the pulse series shown in FIG. 16c occurs across the output of gate device 120. The polarity of these pulses, which coincide as to the instant of occurrence with the equidistant clock pulses, characterizes the polarity of the signal to be transmitted. The signals provided by signal source 118 are handled in gate device 121 in the same manner.

For the transmission of said pulse series through the transmitting device, the pulses occurring at each of the gate devices 120, 121 are separated in two parallel channels 122, 123 and 124, 125 into positive and negative pulses by means of limiters 126, 127 and 128, 129 included in said channels and which suppress the positive and the negative pulses respectively. For example, only positive pulses occur in the channels 122, 124 and only negative pulses occur in the channels 123, 125. The pulses which are separated according to polarity in the channels 122, 123 and 124, 125 are applied as control pulses to bistable generators 130, 131 which pass to one balanced condition upon occurrence of a positive pulse and to the other balanced condition upon occurrence of a negative pulse. The pulse series shown in FIG. 16d thus occurs across the output circuit of pulse generator 130 and an analogous pulse series occurs across the output circuit 131 of pulse generator 130. The two pulse series are transmitted via the transmitting device in the prescribed manner through transmission line 1 to the receiving device of FIG. 15.

The two incoming pulse series are handled in the receiving device of FIG. 15 in the manner previously described, that is to say the incoming pulses, after being demodulated in demodulating devices 27, 28, are applied to bistable pulse regenerators 41, 42, for further use in the registers 45, 46.

The fact that the incoming pulses are derived from a series of equidistant clock pulses results in an improvement in the operation of the described device when the incoming pulses are regenerated between the adders 47, 48 and the inputs of the pulse regenerators 41, 42 according to time of occurrence. More particularly time variations of the incoming pulses, which otherwise would react through the low-pass filters 43, 44 upon the pulse regenerators 41, 42, are thus eliminated. This is particularly advantageous in the described arrangement because the pulse regenerators 41, 42 tend to increase any time variations occurring in the incoming pulses.

To obtain this pulse regeneration according to time of occurrence, gate devices 133, 134 controlled by a clock-pulse generator 132 are included between the adders 47, 48 and the pulse regenerators 41, 42. The gates deliver positive output pulses upon occurrence of a positive signal voltage and negative output pulses upon occurrence of a negative signal voltage. In the manner previously described for the transmitting device of FIGURE 14, the positive and negative output pulses from the gate devices are applied through two parallel-connected channels 135, 136 and 137, 138 including limiters 139, 140 and 141, 142 to the bistable pulse regenerators 41, 42 which pass to one balanced condition upon occurrence of each positive pulse and to the other balanced condition upon each negative pulse. The clock-pulse generator 132 is exactly synchronised in phase by the clock-pulse generator 119 at the transmitter in a manner which is unimportant for the present invention. This synchronisation may be brought about, for example, in a manner which is common practice for pulse code-modulation or, if desired, a separate transmission channel may be used for this purpose.

FIG. 17 shows several time diagrams to explain the receiving device of FIG. 15. If, for example, FIG. 17a shows the signal occurring at adder 47 and FIG. 17b the equidistant clock pulses provided by the clock-pulse generator, the pulses shown in FIG. 17c occur in gate device 133 and are converted in pulse regenerator 41 into the pulse series shown in FIG. 17d. The signals originating from adder 48 are handled in qiute the same manner.

In the described arrangement the regenerated pulses originating from the pulse regenerators 41, 42 are applied directly to the registers 45, 46, but for certain uses it may be advantageous to utilize, instead of the pulses from the pulse regenerators 41, 42, the output pulses from the gate devices 133, 134 as shown in FIG. 17c. If desired, the negative or the positive pulses may then be suppressed.

Instead of using the devices 139, 140, 41 and 141, 142, 42 for pulse regeneration, use may be made of pulse regenerators in the form of monostable pulse generators which deliver output pulses of the desired width when a certain amplitude level of the pulses applied thereto is exceeded. In this case the gate devices 133, 134 need not deliver pulses of different polarities but may be designed so that pulses of only one polarity occur.

FIGS. 18 and 19 show further transmitting and receiving devices for synchronous telegraphy or pulse-code modulation, the transmitted pulse code being specially matched to the properties of the transmission system according to the invention for further improving the freedom of interference which is already excellent. The signals provided by a single signal source 143 are transmitted through the two transmission channels 4, 23 and 5, 24. FIG. 20a for example shows the signal to be transmitted and FIG. 20b shows the equidistant clock pulses from an associated clock-pulse generator 144, which have a recurrence frequency of 4,500 c./s.

In the arrangement here described, the signals from signal source 143 are applied to two channels connected in parallel and including gate devices 145 and 146 which are controlled alternately by the gate pulses derived from clock-pulse generator 144. For this purpose the clock pulses from clock-pulse generator 144 (FIG. 20b) are applied to a bistable pulse generator 147, which, upon occurrence of each clock pulse, passes from one balanced condition to the other, thus resulting in the pulse series shown in FIG. 20c. The gate pulses for gate device 145 are obtained by differentiation in a differentiating network 148 and subsequent limitation of the negative pulses in a limiter 149, and the gate pulses for gate device 146 are obtained by applying the pulse series of FIG. 20c through a phase-inverting stage 150 to the cascade connection of a differentiating network 151 and a limiter 152. The gate pulses for the gate devices 145, 146, which are shown in FIGS. 20d and 20e, respectively, thus occur across the outputs of the limiters 149, 152.

A gate pulse is applied alternately to the gate devices 145 and 146. The gate devices are adjusted so that a pulse is passed by them only upon a positive signal voltage, resulting in the pulse series shown in FIGS. 20f and FIG. 20g occurring at the output circuits of the gate devices 145, 146.

For the transmission through the two transmission channels 4, 5 the two pulse series of FIGS. 20f and 20g are applied to pulse generators 153, 154 which, upon occurrence of each positive pulse, pass from one balanced condition to the other for producing the pulse series shown in FIGS. 20h and 20i. These pulses are transmitted to the receiving device in the manner described above. The two pulse series have half the transmission velocity of the original signal in FIG. 20a and thus a transmission velocity of 2,250 baud.

In the transmission system here described the edges of the transmitted pulse series of FIGS. 20h and 20i characterise a positive signal voltage of the signal-voltage source 143 upon occurrence of a gate pulse. These transmitted pulses are thus quite different from those of the transmission system shown in FIGS. 14 and 15. In the latter transmission system, for example, a single positive pulse will be transmitted by the pulse generators 130, 131 upon a series of sequential positive output pulses in the gate devices 120, 121, in contrast to the transmission system of FIGS. 18 and 19 in which in this case a series of alternately positive and negative pulses is transmitted by the pulse generators 153, 154. It is due to this fact that, in the transmission system of FIGS. 18 and 19, the insensitivity to interference may be increased still further, as will be explained hereinafter.

In the receiving device of FIG. 19 which co-acts with the transmitting device of FIG. 18, the demodulated signals in the demodulating devices 27, 28, after being summated in the adders 47, 48 with the output voltages of the now-pass filters 43, 44 connected to the output circuits of the pulse regenerators 41, 42, are applied to the pulse regenerators 41, 42. FIGS. 21a and 21b show the voltages when set up across the adders.

In a similar manner as in the receiving device of FIG. 15, gate devices 133, 134 are included between the adders 47, 48 and the pulse regenerators 41, 42. The gate pulses for the gate devices 133, 134 are derived from a clock-pulse generator 155 which is exactly stabilised in phase by the clock-pulse generator 147 at the transmitter for producing the voltage shown in FIG. 21c, which corresponds to the voltage of FIG. 20c. The gate pulses for gate device 133 are produced by differentiation in a differentiating network 156 and subsequent limitation of the negative pulses in a limiter 157. The gate pulses for gate device 134 are obtained by applying the output pulses from pulse generator 155 through a phase-inverting stage 158 to a differentiating network 159 and a subsequent limiter 160 for suppressing the negative pulses. FIGS. 21d and 21e show the gate pulses thus produced for the gate devices 133, 134.

In design and operation the gate devices 133, 134 and the pulse regenerators 41, 42 are quite identical with those of the receiving device of FIG. 15. The pulse series shown in FIGS. 21f and 21g occur at the outputs of the gate devices 133, 134 and the pulse series shown in FIGURES 21h and 21i occur at the outputs of the pulse regenerators 41, 42, in the manner as previously explained with reference to FIG. 15. The last-mentioned pulse series exactly corresponds in waveform to the transmitted pulses of FIGURES 20h and 20i originating from the pulse generators 153, 154 at the transmitter.

For further handling of the output pulses from the pulse regenerators 41, 42 in the register 161, the pulse series of FIGURES 21h and 21i are converted in converting devices 162, 163 into pulse series which coincide with the edges of said pulses and which, after being summated in adder 164, are jointly applied to the register 161, since the edges of the pulse series of FIGURES 21h and 21i characterize, as explained above, the occurrence of a positive signal voltage of signal-voltage source 143.

In the arrangement shown, for the conversion of the pulse series of FIGURES 21h and 21i in the converting devices 162, 163, the pulse series are applied, on the one hand, directly to the cascade connection of differentiating networks 165, 166 and limiters 167, 168 for suppressing the negative pulses produced upon differentiation and, on the other hand, through phase-inverting stages 169, 170 to a cascade connection of differentiating networks 171, 172 and limiters 173, 174. The pulse series shown in FIGURES 21j and 21k occur at the outputs of the converting devices 162, 163 and coincide with the edges of the pulse series of FIGURES 21h and 21i. Summation of the two pulse series of FIGURES 21j and 21k results in the pulse series shown in FIG. 21l. The pulses of this pulse series, which characterise a positive signal voltage from signal-voltage source 143, as previously mentioned, are applied for further handling to the register 161.

The fact that, in the transmission system shown in FIGS. 18 and 19, the edges of the transmitted pulses (see FIGURES 20h and 20i) and not these pulses as such are used for the signal transmission results in optimum freedom of interference in the transmission system according to the invention. If, for example, in the transmission system of FIGURES 14 and 15, an extremely long signal occurs there is a possibility, though very small, that as a result of a strong interference voltage, the pulse regenerators 41, 42 at the receiving end pass to the other balanced condition and are maintained in this balanced condition for the further duration of the signal due to their feedback circuits including the low-pass filters, so that the extremely long signal is transmitted with wrong polarity for its further duration. Since in the transmission system shown in FIGURES 18 and 19 only the edges of the transmitted pulse are used (see FIGURES 21h and 21i) such changeover of the pulse regenerators 41, 42 is much less interfering because it gives rise to only a single interference pulse in the converting devices 162, 163.

The transmission system according to the invention has been explained above with reference to several embodiments, it being mentioned for the sake of completeness that the various elements may also be designed in different ways. For example, for converting the pulse series shown in FIGURES 21h and 21i into the pulse series of FIGURES 21j and 21k, corresponding to the edges of the pulses, the converting devices 162, 163 may alternatively be a cascade connected circuit of a differentiating network and a push-pull rectifier. It is further to be noted that, whenever in the description reference is made to positive pulses, the negative pulses may be used instead.

The pulse transmission system described in detail hereinbefore with its exceptionally high pulse information of 1.7 baud per c./s. of bandwidth and with its optimum freedom of interference, simple structure and great flexibility has been given the name Complementary-Orthogonal modulation or, in brief, CO-modulation, thereby indicating the complementary action of the suppression and regeneration of frequency components at the transmitting and receiving ends, together with the orthogonal method of modulation of the two transmission channels.

What is claimed is:

1. A pulse transmission system comprising a transmitter, a receiver, and a transmission path between said transmitter and receiver, said transmitter comprising a source of first and second pulse signals, first and second transmitter channels, means applying said first and second signals to said first and second transmitter channels respectively, at least one of said channels including means for suppressing the direct current component of signals in said one channel, a source of common carrier oscillations, first and second modulator means for modulating said carrier oscillations with the signals of said first and second channels respectively with a mutual phase displacement of 90°, means providing pilot oscillations of the frequency of said carrier oscillations, and means applying said pilot oscillations and the outputs of said first and second modulator means to said transmission path; said receiver comprising first and second receiving channels, each of said receiving channels comprising demodulator means and pulse regenerator means, means connecting each said demodulator means to said transmission path, and means connecting the output of each said demodulator means to said pulse regenerator means of the respective channel, said receiver further comprising means providing a local carrier oscillation synchronized with said pilot oscillations, and means applying said local carrier oscillations to the demodulator means of said first receiver channel for demodulating the signals corresponding to signals of said first transmitter channel which were transmitted with suppression of the direct current component, the pulse regenerator of said first receiver channel comprising low-pass filter negative feedback means having a time constant substantially equal to the time constant of said means for suppressing said direct current component.

2. A pulse transmission system comprising a transmitter, a receiver, and a transmission path between said transmitter and receiver, said transmitter comprising a source of first and second pulse signals, first and second transmitter channels, means applying said first and second signals to said first and second transmitter channels respectively, each of said channels including means for suppressing the direct current component of signals in the respective channel, a source of common carrier oscillations, first and second modulator means for modulating said carrier oscillations with the signals of said first and second channels respectively with a mutual phase displace of 90°, means providing pilot oscillations of the frequency of said carrier oscillations, and means applying said pilot oscillations and the outputs of said first and second modulator means to said transmission path; said receiver comprising first and second receiving channels, each of said receiving channels comprising demodulator means and pulse generator means, means connecting each said demodulator means to said transmission path, and means connecting the output of each said demodulator means to the respective pulse regenerator means, said receiver further comprising means providing a local carrier oscillation synchronized with said pilot carrier oscillations, and means applying said local carrier oscillations to the demodulator means of each of said receiver channels with a mutual phase displacement of 90° for demodulating the signals corresponding to signals of the respective transmitter channels, the pulse regenerator of each receiver channel comprising low-pass filter negative feedback means having a time constant substantially equal to the time constant of said means for suppressing said direct current component in the respective transmitter channel.

3. The transmission system of claim 2 wherein said suppressing means have a transmission characteristic $\phi_1(\omega)$ and said feedback means have a transmission characteristic $\phi_2(\omega)$, said transmission characteristics being related by the expression $$\phi_1(\omega)+\phi_2(\omega)=1$$

4. A transmitter for transmitting pulse signals, comprising a source of first and second pulse signals, first and second transmitter channels, means applying said first and second signals to said first and second transmitter channels respectively, each of said channels comprising means for suppressing the direct current component of signals applied thereto, and modulator means, and means applying the output of each said suppressing means to the respective modulator means, a source of common carrier oscillations, means applying said common carrier oscillations to said modulator means of said first and second channels with a mutual phase displacement of 90°, means providing pilot oscillations of the frequency of said carrier oscillations, a common transmission channel, and means for applying said pilot oscillations and the output of said modulators of said first and second channels to said common transmission channel.

5. The transmitter of claim 4 in which said source of first and second pulse signals comprises a source of a pulsatory signal, first and second pulse channels for applying said pulsatory signal to said first and second transmitter channels respectively, each of said first and second channels comprising differentiating means, and pulse regenerating means, in that order, only one of said channels further comprising inverting means, whereby the output of the differentiating means of one pulse channel corresponds to the leading edges of pulses of said pulsatory signal and the output of the differentiating means of the other pulse channel corresponds to the trailing edges of pulses of said pulsatory signal.

6. The transmitter of claim 4 comprising a source of clock pulses, first and second gate means, first and second pulse regenerating means, means applying said first and second pulse signals to said first and second transmitting channels respectively by way of said first and second gate means respectively and said first and second regenerating means respectively in that order, and means applying said clock pulses to said first and second gate means for opening said gate means.

7. The transmitter of claim 4 wherein said source of first and second pulse signals comprises a source of a pulsatory signal, first and second pulse channels for applying said pulsatory signal to said first and second transmitter channels respectively, each of said first and second channels comprising gate means and pulse regenerating means in that order, a source of clock pulses, and means for applying said clock pulses to said gate means for alternately opening the gate means in said first and second pulse channels.

8. A receiver for receiving a transmitted signal of the type including first and second pulse signals orthogonally modulated on a carrier oscillation after passing through D.C. suppression networks, and a pilot oscillation of the frequency of said carrier oscillation, said receiver comprising first and second receiving channels, each of said channels comprising demodulator means and pulse regenerator means, means for applying said transmitted signal to each said demodulator means, and means connecting the output of each said demodulator means to the respective pulse regenerator means, said receiver further comprising means for providing a local carrier oscillation synchronized with said pilot oscillation, and means applying said local carrier oscillations to said demodulator means of said first and second channels with a mutual phase displacement of 90°, whereby said first and second pulse signals are produced at the output of the demodulator means of said first and second channels respectively, said pulse regenerator means for each channel comprising low pass filter negative feedback means having a time constant substantially equal to the time constant of said networks.

9. The receiver of claim 8 wherein said means providing a local carrier oscillation comprises a local oscillator, difference producing means, low pass filter means for applying the output of each demodulator means to said difference producing means, frequency correcting means connected to said local oscillator, and means for applying the output of said difference producing means to said frequency correcting means for synchronizing the phase of oscillations from said local oscillator with said pilot oscillations.

10. The receiver of claim 8 wherein said means for applying said transmitted signal to said demodulator means comprises level control means, comprising low pass filter means, means for applying the output of one of said demodulator means to said level control means by way of said low pass filter means for controlling the amplitude of signals applied to said demodulator means.

11. The receiver of claim 8 wherein each of said pulse regenerator means comprises adding means, means for applying the output of the respective demodulator means to said adding means, bistable circuit means, means applying the output of said adding means to said bistable circuit means, and means for connecting said low pass filter means between the output of said bistable circuit means and said adding means, whereby the outputs of said demodulator means and low pass filter means are added in said adding means.

12. The receiver of claim 11 wherein said means for applying the output of said adding means to said bistable circuit means comprises correcting circuit means, said corrector circuit means comprising means for limiting the positive and negative excursions of signals applied to said bistable circuit means, and a parallel resistor-capacitor circuit for applying the output of said adding means to said limiting means.

13. The receiver of claim 8 wherein said first and second pulse signals are bistable signals corresponding to the leading and trailing edges respectively of the pulses of a pulsatory signal, comprising first and second pulse converting means connected to the outputs of said first and second channels respectively, and pulse regenerating means connected to the outputs of said pulse converting means for regenerating said pulsatory signal, each of said converting means comprising first and second parallel paths each including differentiating means, and inverting means in only one path of each of said converting means.

14. The receiver of claim 8 for receiving said transmitted signal wherein said first and second pulse signals are synchronized with clock pulses, comprising a source of clock pulses, each of said pulse regenerating means comprising adding means connected to the outputs of said demodulating means and of said low pass filter negative feedback means, gate means connected to the output of said adding means, bistable circuit means, means applying the output of said gate means to said bistable circuit means, means for applying the output of said bistable circuit means to the input of said low pass filter negative feedback means, and means for applying said clock pulses to said gate means as a control signal.

15. The receiver of claim 14 wherein said first and second pulse signals correspond to alternate sampling of a pulsatory signal at a clock pulse rate, comprising means for applying alternate clock pulses to said gate means in the pulse regenerating means of said first and second channels, first and second pulse converting means connected to the outputs of said first and second channels respectively, and pulse adding means connected to the outputs of said first and second converting means for regenerating said pulsatory signal, each of said converting means comprising first and second parallel paths each including differentiating means, and inverting means in only one path of each of said converting means.

References Cited by the Examiner
UNITED STATES PATENTS

| | | | |
|---|---|---|---|
| 2,065,826 | 12/1936 | Roosenstein et al. | 325—62 |
| 3,031,529 | 4/1962 | Colodny | 179—15 |
| 3,080,526 | 3/1963 | Porter. | |
| 3,123,670 | 3/1964 | Kaenel | 178—66 |
| 3,205,442 | 9/1965 | Stamboulis | 178—66 X |

ROBERT L. GRIFFIN, *Primary Examiner.*

J. T. STRATMAN, *Assistant Examiner.*